(12) United States Patent
Mance

(10) Patent No.: US 6,434,978 B1
(45) Date of Patent: Aug. 20, 2002

(54) RING ROLLER FOR HIDE SPLITTING PROCESS

(76) Inventor: Vitomir Mance, 33 Watson Road South, Guelph, Ontario (CA), N1H 4P9

( * ) Notice: Subject to any disclaimer, the term of this patent is extended or adjusted under 35 U.S.C. 154(b) by 0 days.

(21) Appl. No.: 09/734,023

(22) Filed: Dec. 12, 2000

Related U.S. Application Data

(60) Provisional application No. 60/175,713, filed on Jan. 12, 2000.

(51) Int. Cl.$^7$ ................................................ C14B 1/14

(52) U.S. Cl. ..................................... 69/9; 69/1; 69/21.5

(58) Field of Search ................... 69/9, 1, 21.5, 9.1, 69/9.3, 11, 13, 37, 38, 42, 43; 271/1

(56) References Cited

U.S. PATENT DOCUMENTS

| | | | | |
|---|---|---|---|---|
| 1,010,752 A | * | 12/1911 | Haines | 69/9 |
| 1,158,627 A | * | 11/1915 | Broughton | 69/9 |
| 1,210,401 A | * | 1/1917 | Bergstrom | 69/9 |
| 1,434,019 A | * | 10/1922 | Meyer | 69/9 |
| 1,586,100 A | * | 5/1926 | Meyer | 69/9 |
| 1,594,875 A | * | 8/1926 | Brenner | 69/9 |
| 3,028,742 A | * | 4/1962 | Hacker et al. | 69/9 |
| 3,028,743 A | * | 4/1962 | Hacker et al. | 69/9 |
| 3,090,055 A | * | 5/1963 | Peterson et al. | 69/9 |
| 3,109,339 A | * | 11/1963 | Braun et al. | 69/9 |
| 3,291,175 A | * | 12/1966 | Burch | 69/9 |
| 3,538,723 A | * | 11/1970 | Imgrund et al. | 69/9 |
| 3,736,776 A | * | 6/1973 | Repetto | 69/13 |
| 4,244,201 A | * | 1/1981 | Repetto | 69/13 |
| 4,444,028 A | * | 4/1984 | Repetto | 69/13 |

FOREIGN PATENT DOCUMENTS

| | | |
|---|---|---|
| DE | 32 04 182 A1 | 10/1983 |
| EP | 0 870 581 A2 | 10/1998 |

OTHER PUBLICATIONS

English abstract from ESPACENET of US 5238234.
English abstract from ESPACENET of DE 3327458.
English abstract from ESPACENET of US 4617809.
English abstract from ESPACENET of EP 0078528.
English abstract from ESPACENET of EP 0093353.
English abstract from ESPACENET of FR 2555928.
English abstract from ESPACENET of US 4055059.
English abstract from ESPACENET of FR 2543475.
English abstract from ESPACENET of FR 2518919.
English abstract from ESPACENET of FR 2511923.
English abstract from ESPACENET of FR 2512462.
English abstract from ESPACENET of FR 2518574.
English abstract from ESPACENET of DE 3422723.
English abstract from ESPACENET of DE 3418105.
Letter from Mance Manufacturing Limited regarding Prior Sales of Pro–Split™ Ring Roller Assembly (5 pages including 3 pages of drawings).

* cited by examiner

Primary Examiner—Danny Worrell
Assistant Examiner—Gary L. Welch
(74) Attorney, Agent, or Firm—R. Craig Armstrong

(57) ABSTRACT

A ring roller, used in the hide splitting process as a hide transport device, is described that is continuously self cleaning and which provides a constant gap between outer rings of a ring roller. The ring roller is capable of directing pressurized water, or other gaseous and/or liquid fluid from the internal to the external surface of the ring roller. The constant supply of pressurized water, or other gaseous and/or liquid fluid from the internal to the external surface of the ring roller prevents the entry of lime solution, flesh, fat, grease, and other materials that result from the hide splitting process, into the ring roller. Therefore, the ring roller constantly and continuously provides optimum, consistent, high quality performance. Maintenance downtime for the ring roller is minimized. The ring roller, properly operated, will perform to expected design and operational parameters.

11 Claims, 23 Drawing Sheets

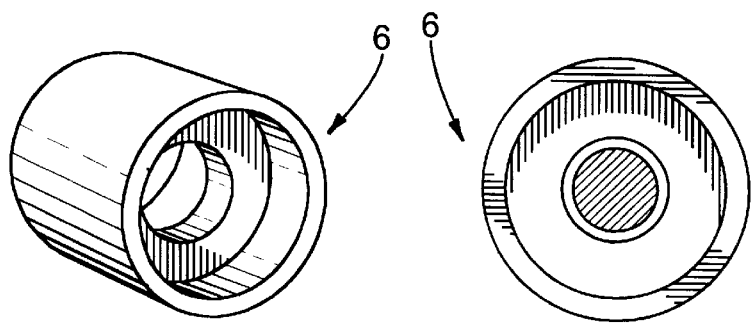
FIG.2APriorArt    FIG.2BPriorArt
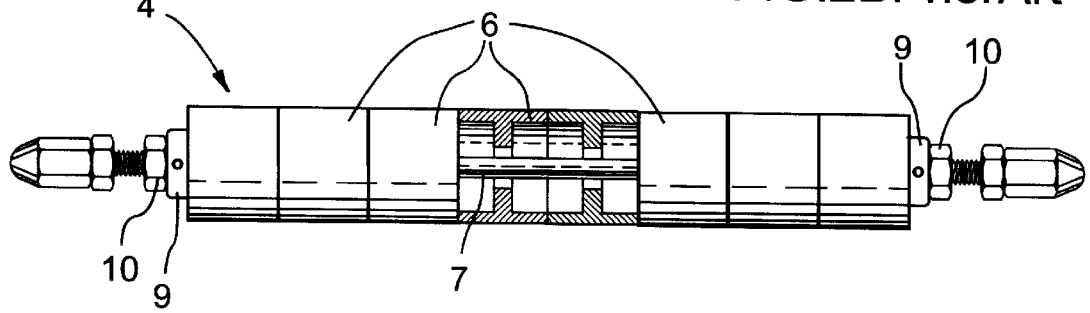
FIG.2CPriorArt
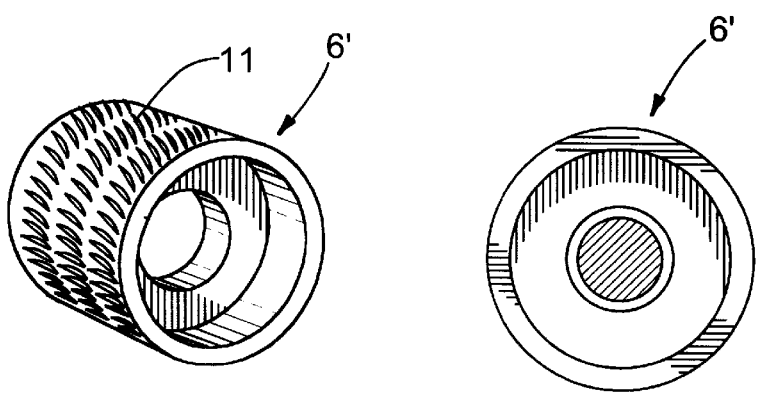
FIG.3APriorArt    FIG.3BPriorArt
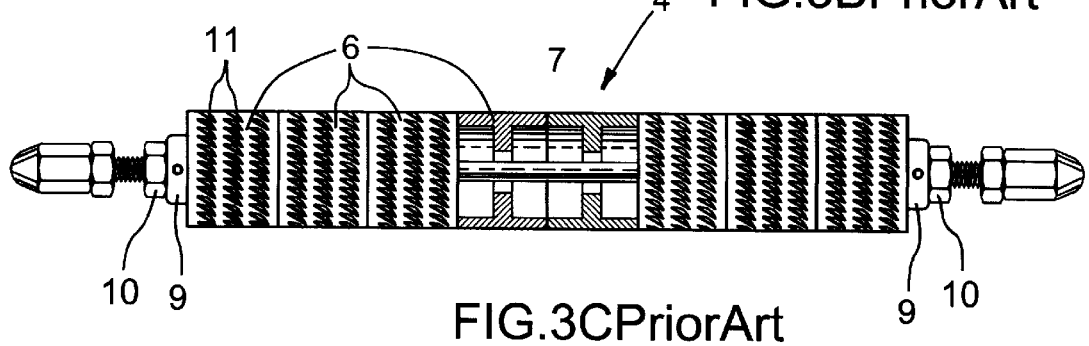
FIG.3CPriorArt

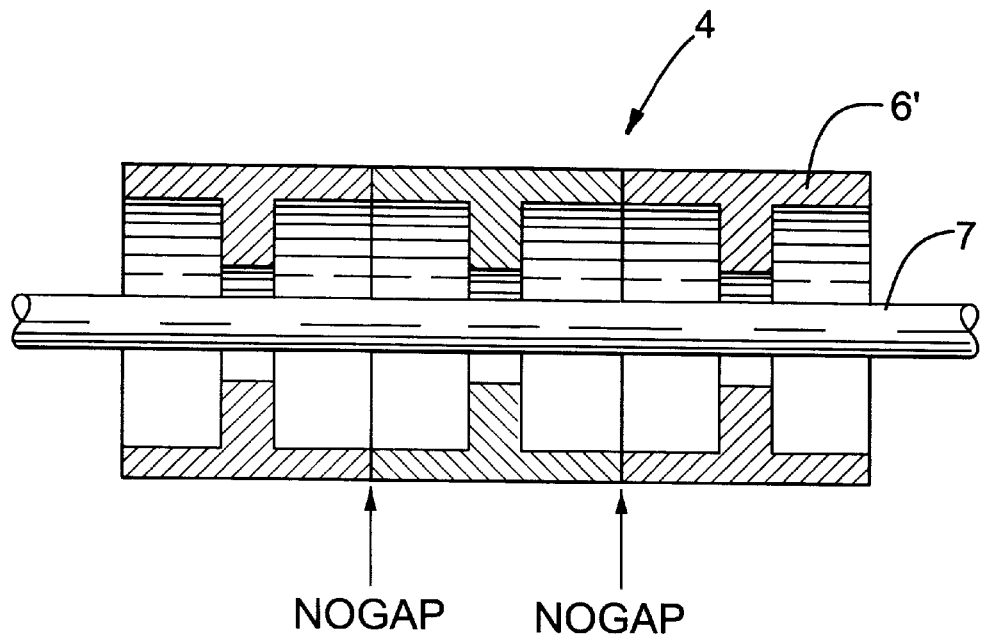
FIG.4APriorArt
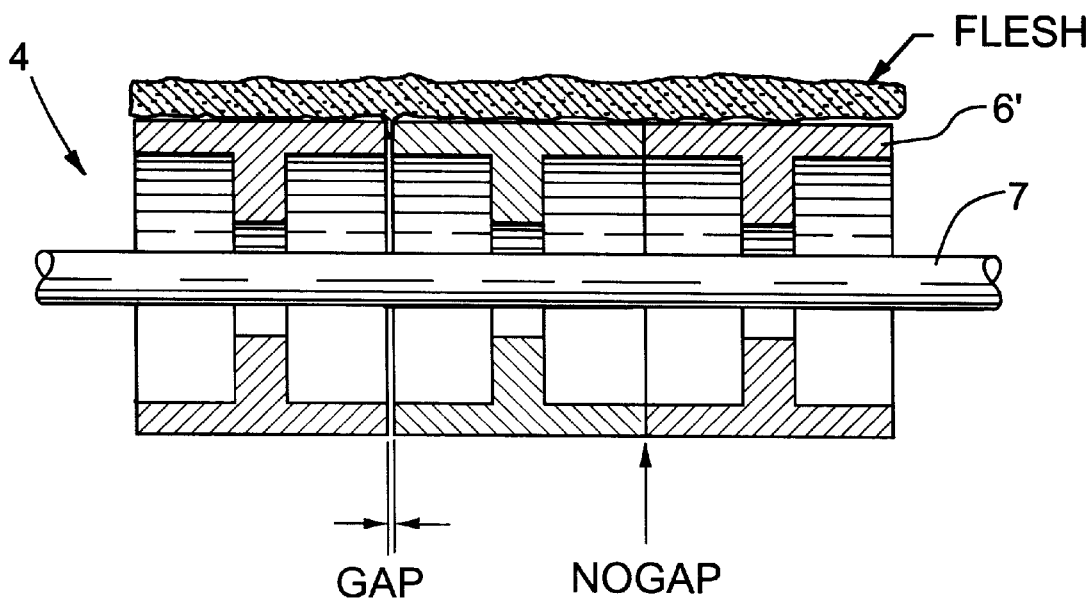
FIG.4BPriorArt

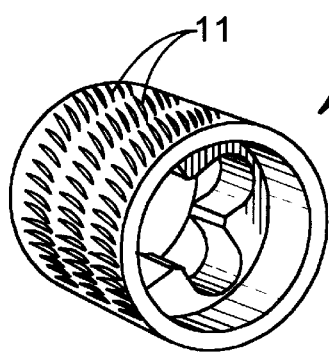 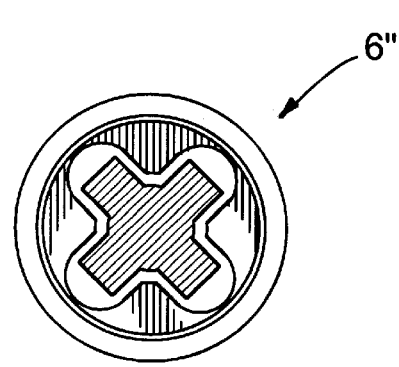
FIG.5APriorArt    FIG.5BPriorArt
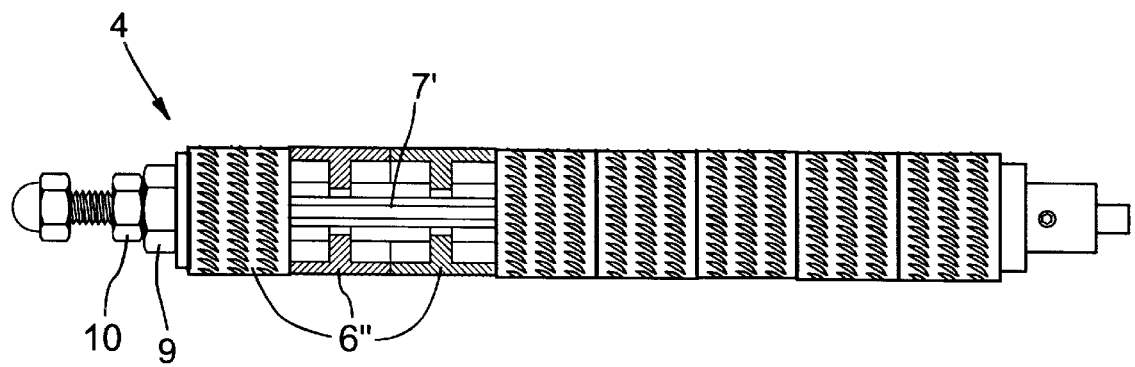
FIG.5CPriorArt
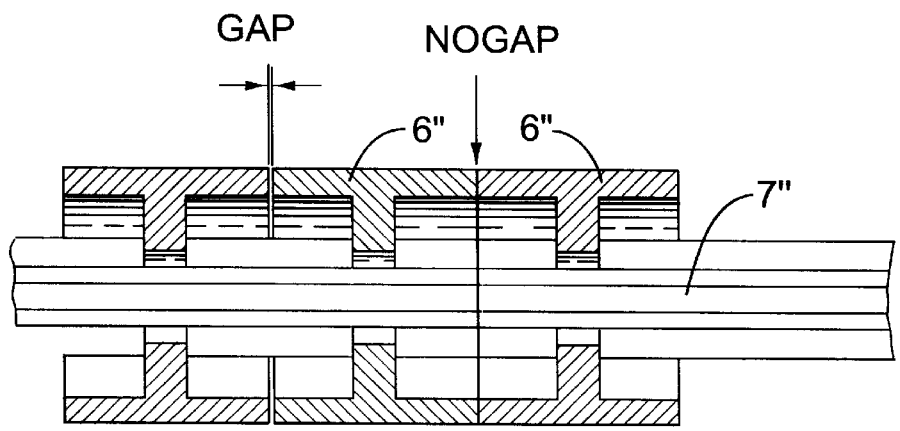
FIG.5DPriorArt

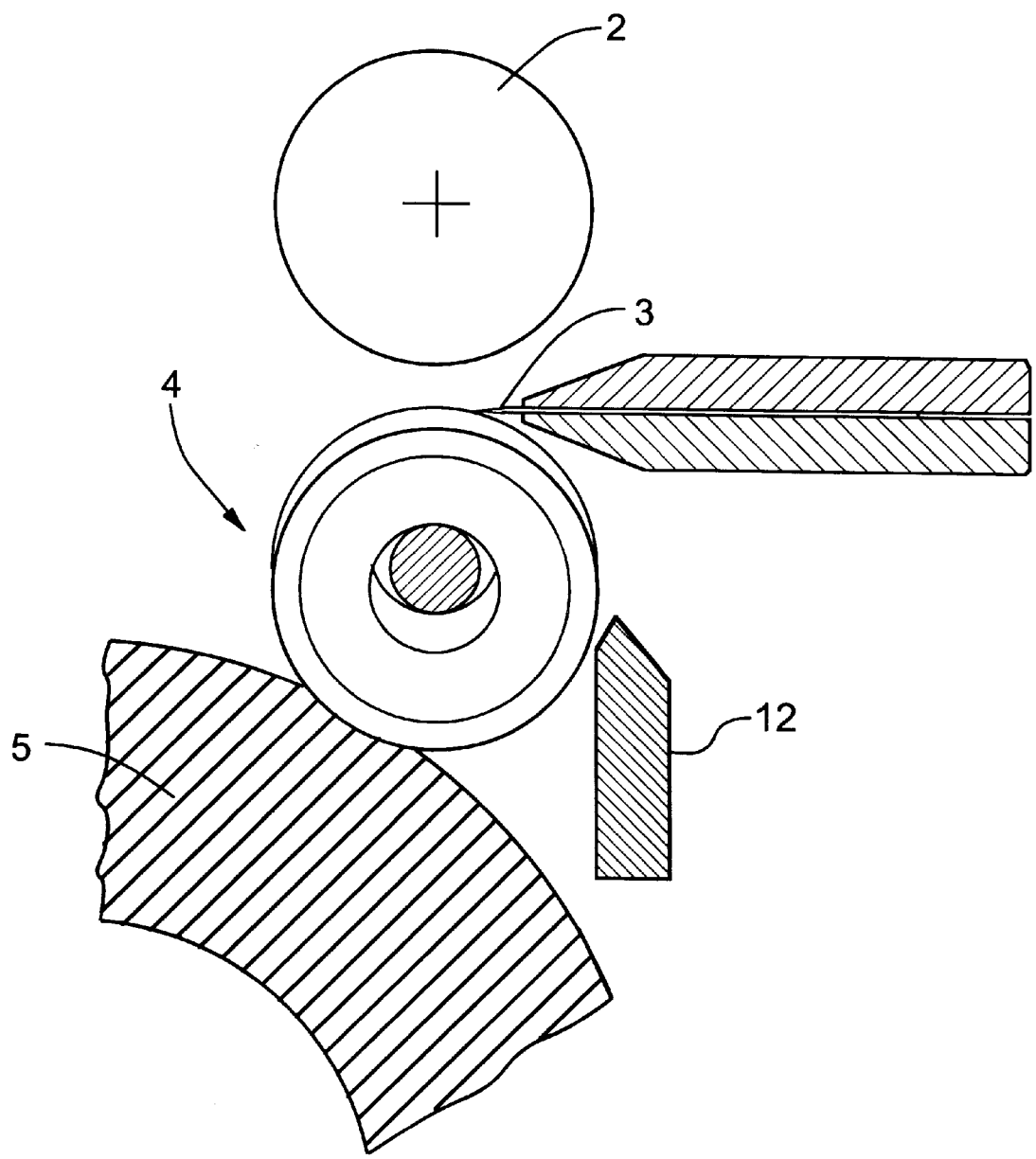
FIG.6PriorArt

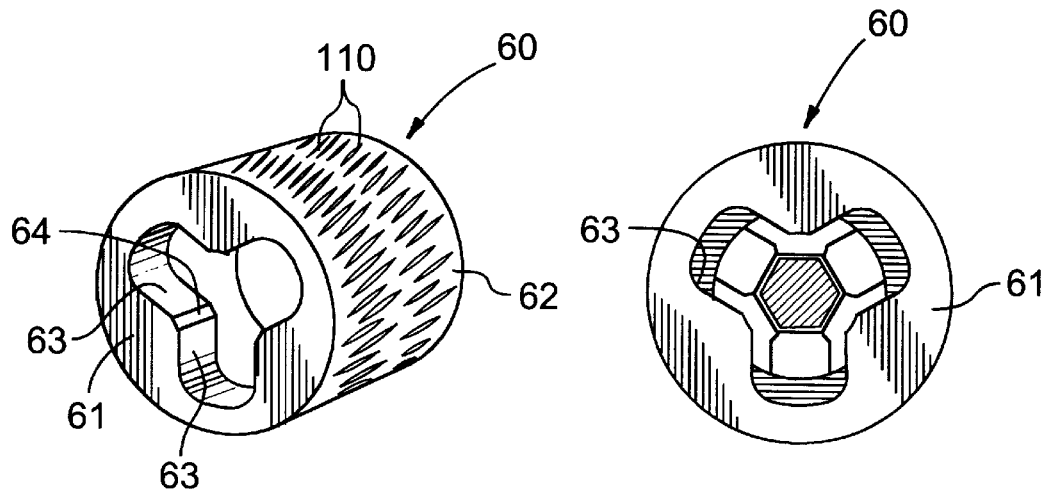
FIG.7A PriorArt         FIG.7B PriorArt
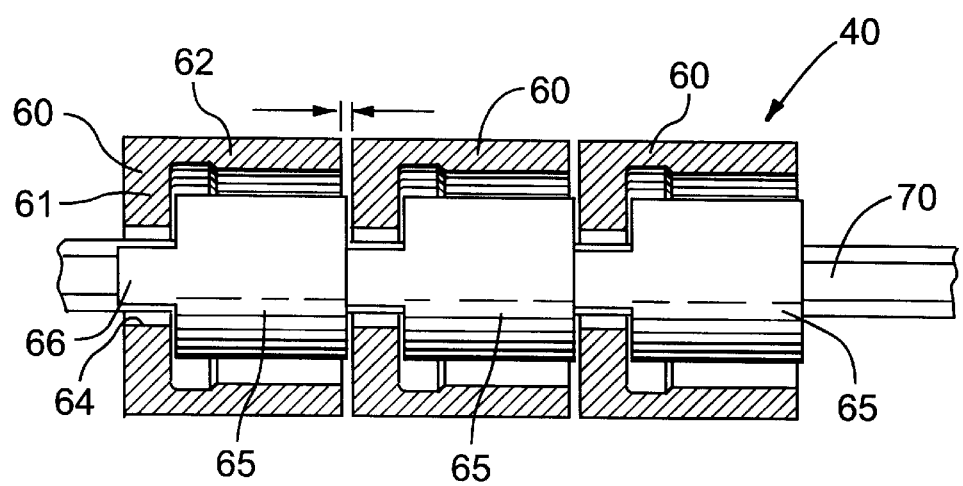
FIG.7C PriorArt

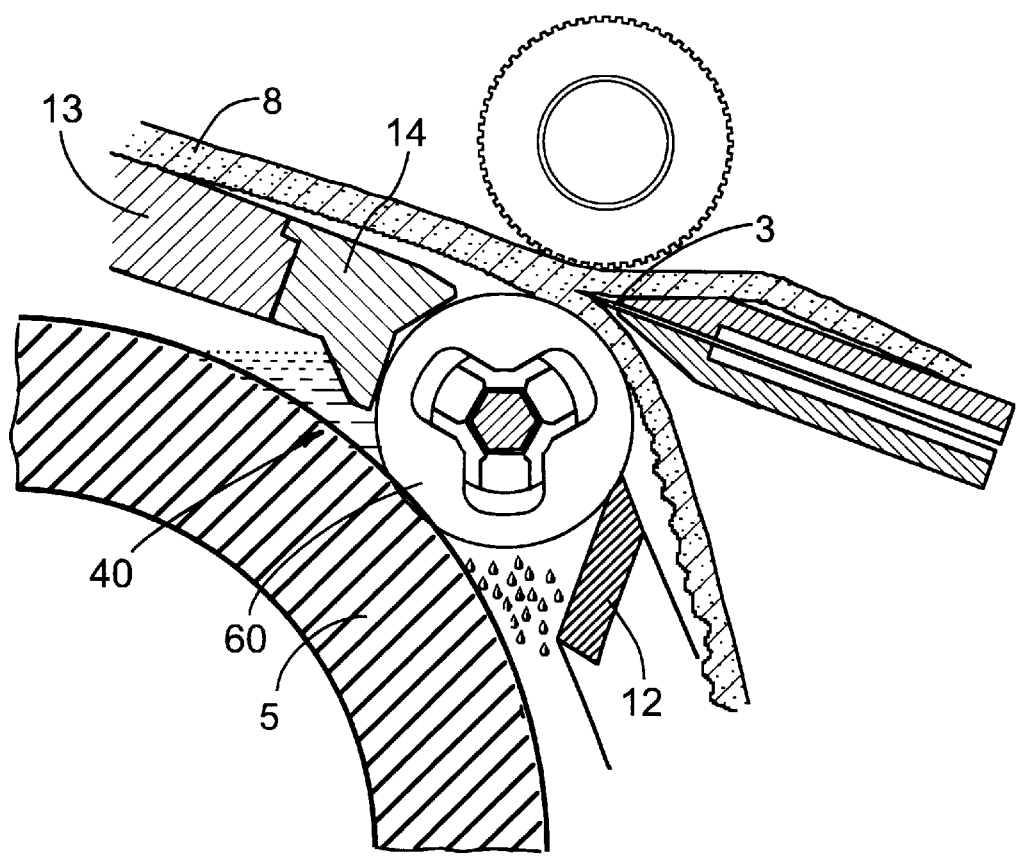
FIG.8APriorArt
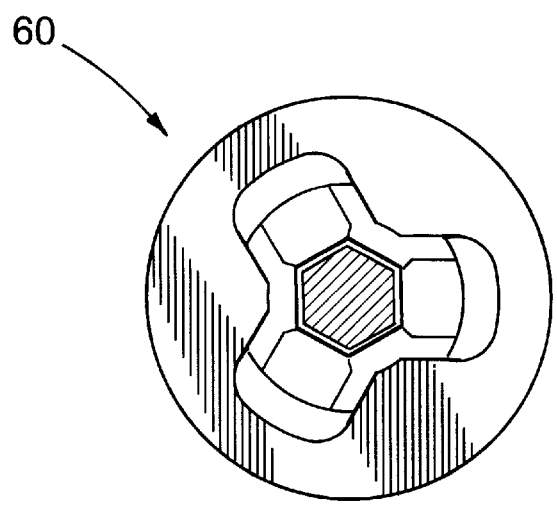
FIG.8BPriorArt

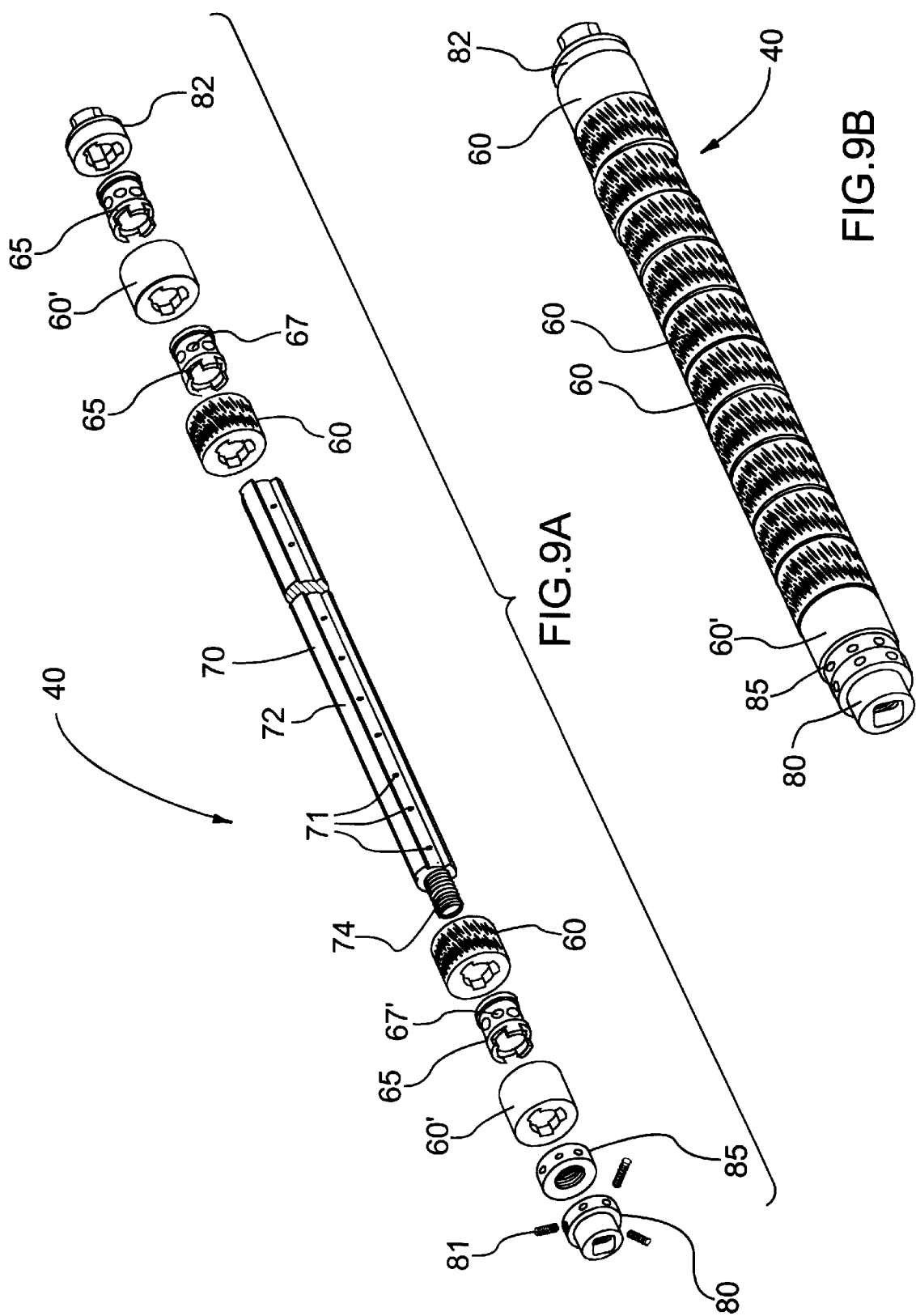

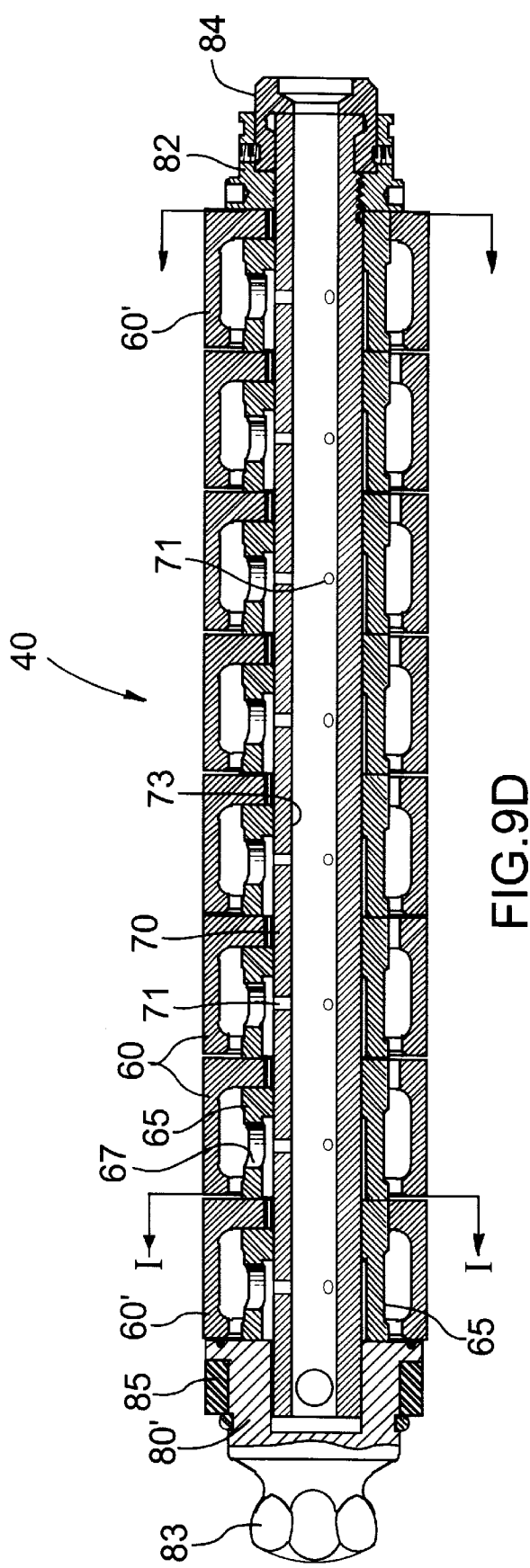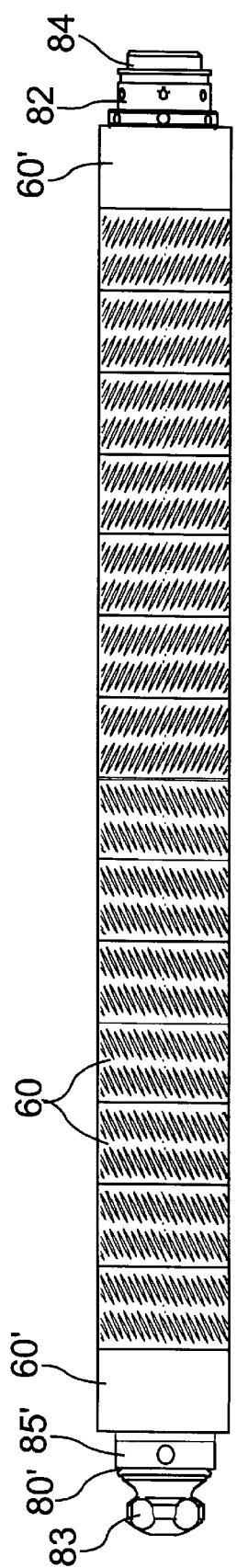

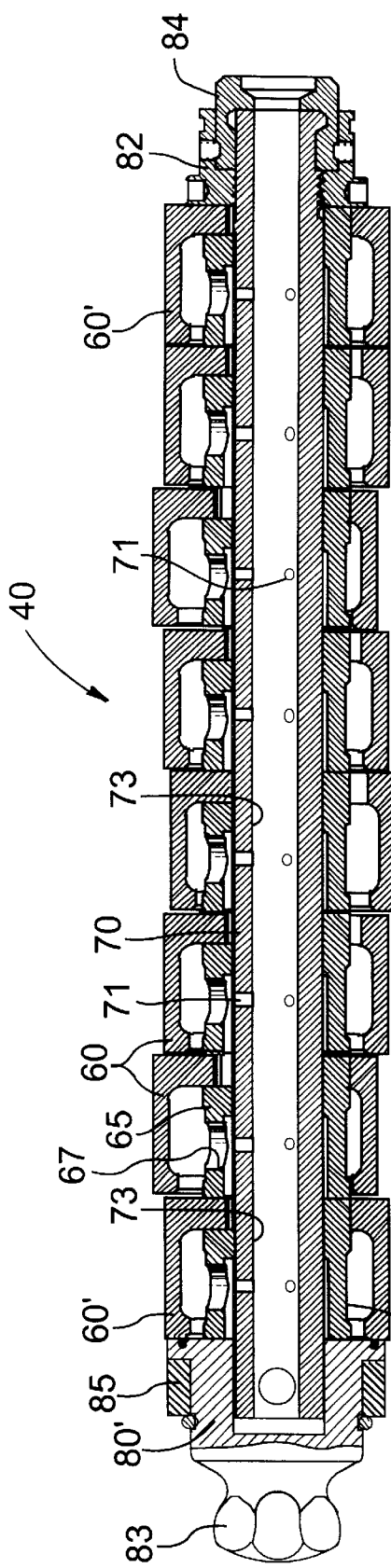
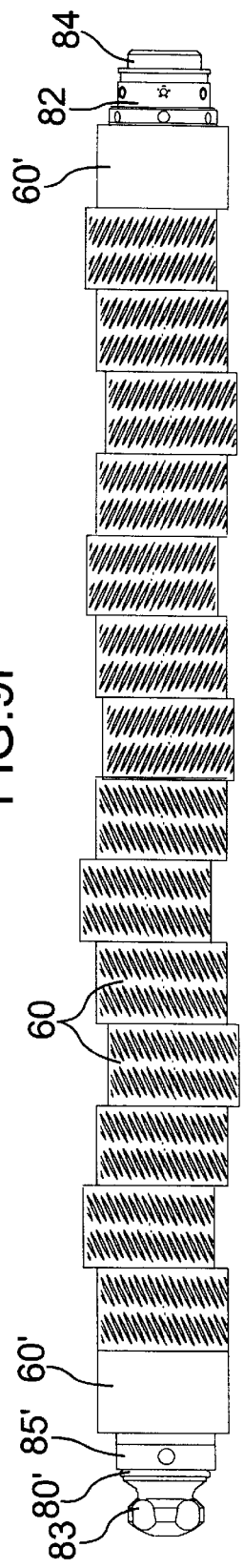
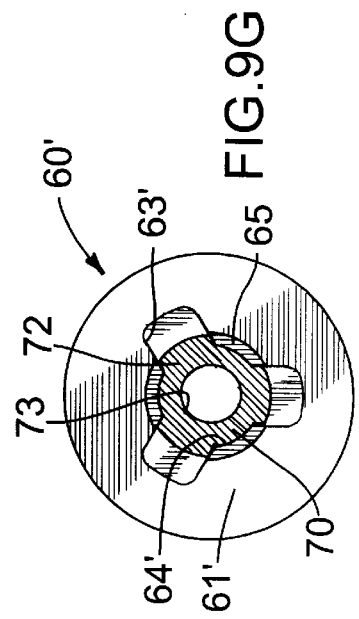
FIG. 9F
FIG. 9E
FIG. 9G

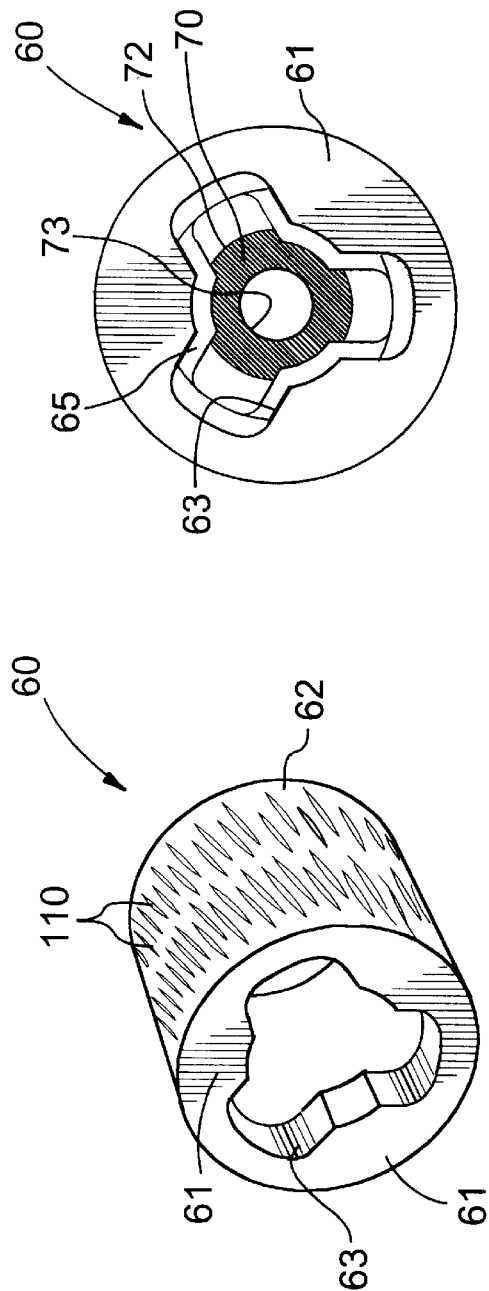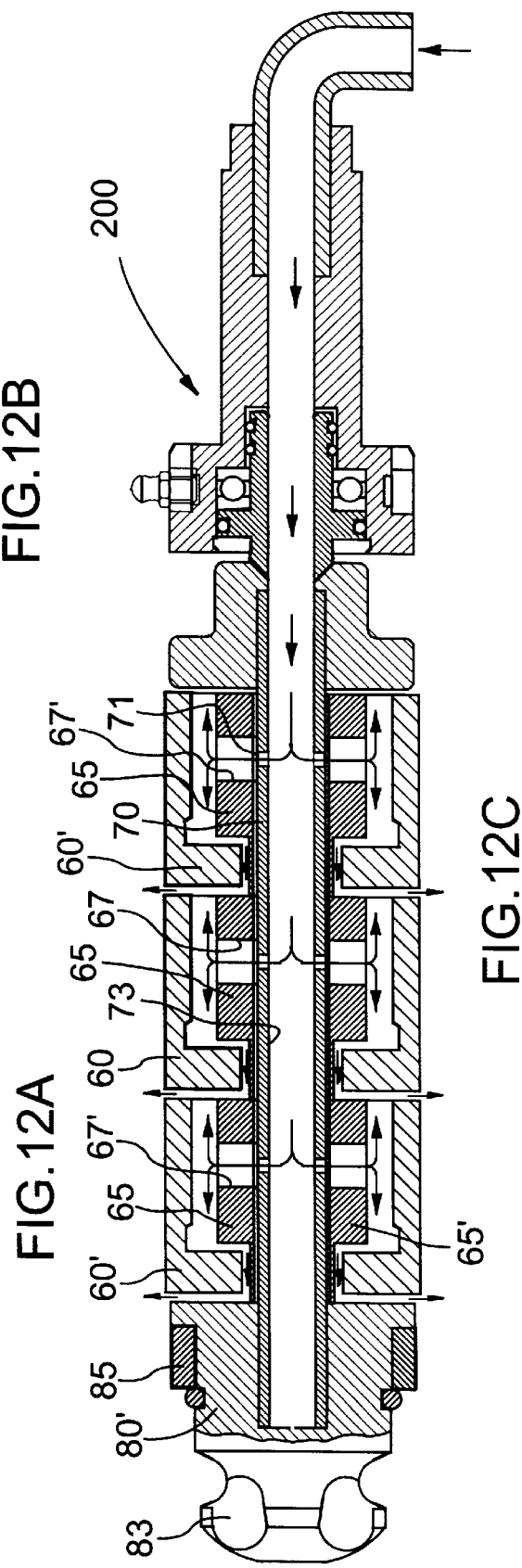

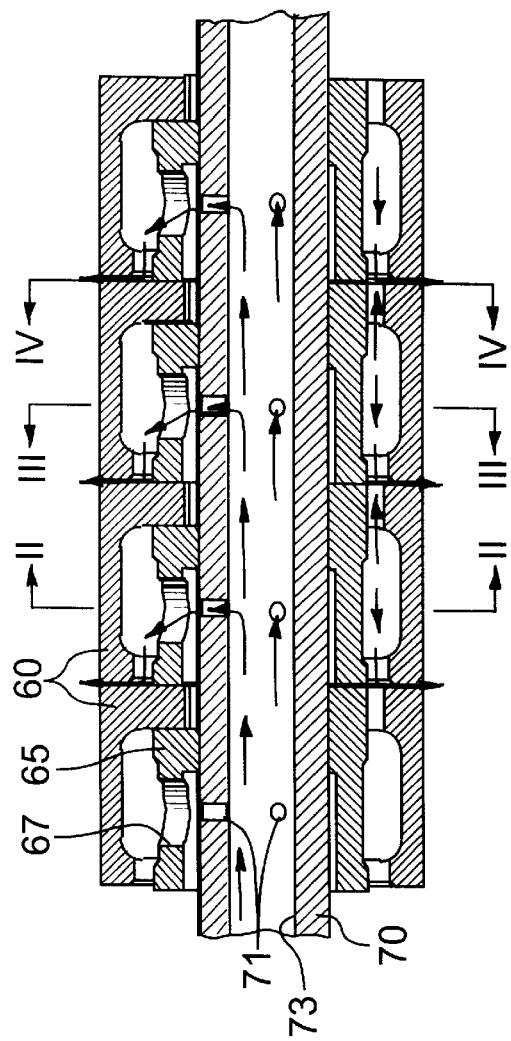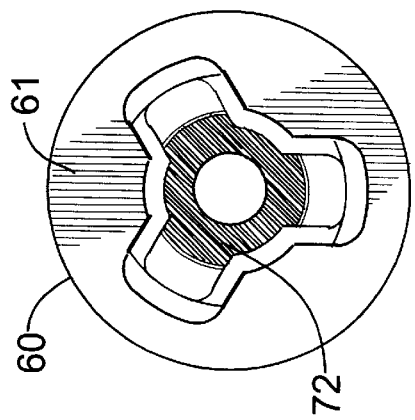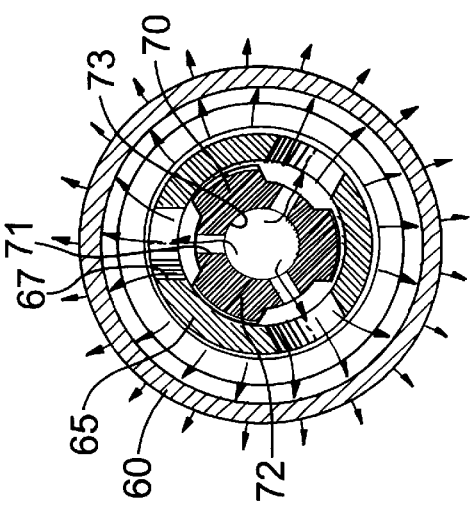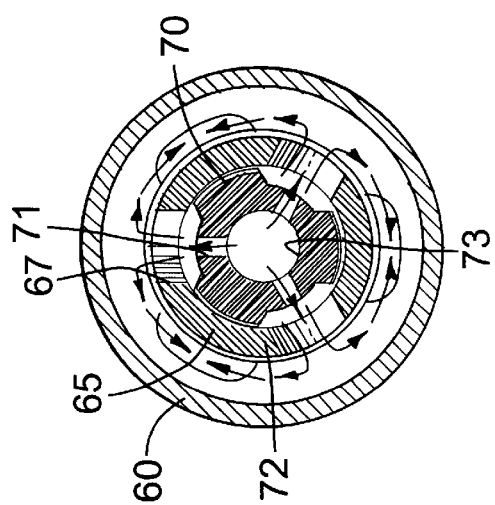
FIG.12E
FIG.12F
FIG.12G
FIG.12H

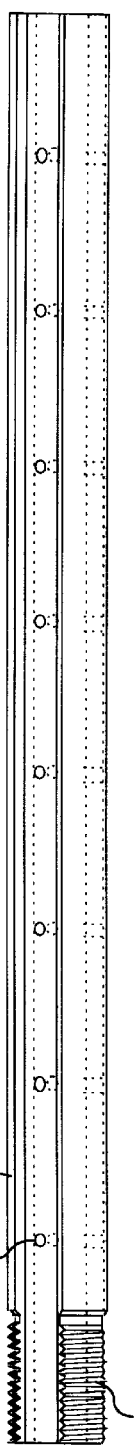
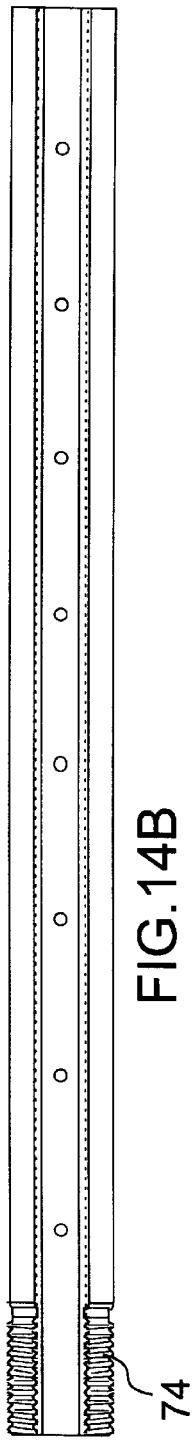
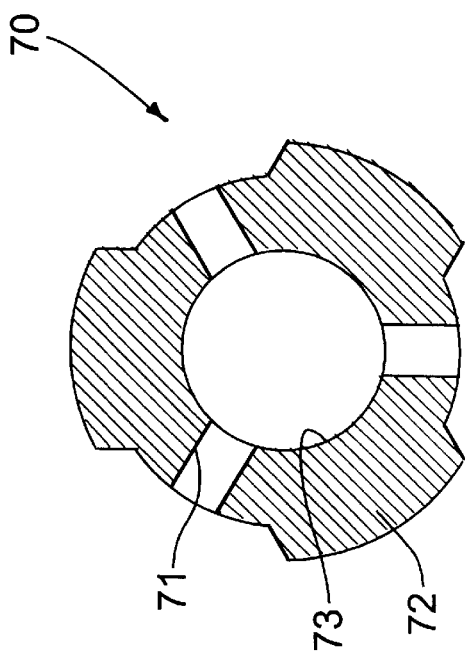
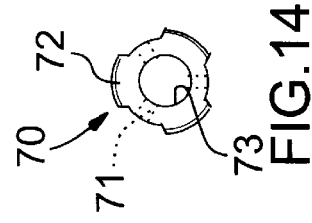
FIG.14A
FIG.14B
FIG.14C
FIG.14D

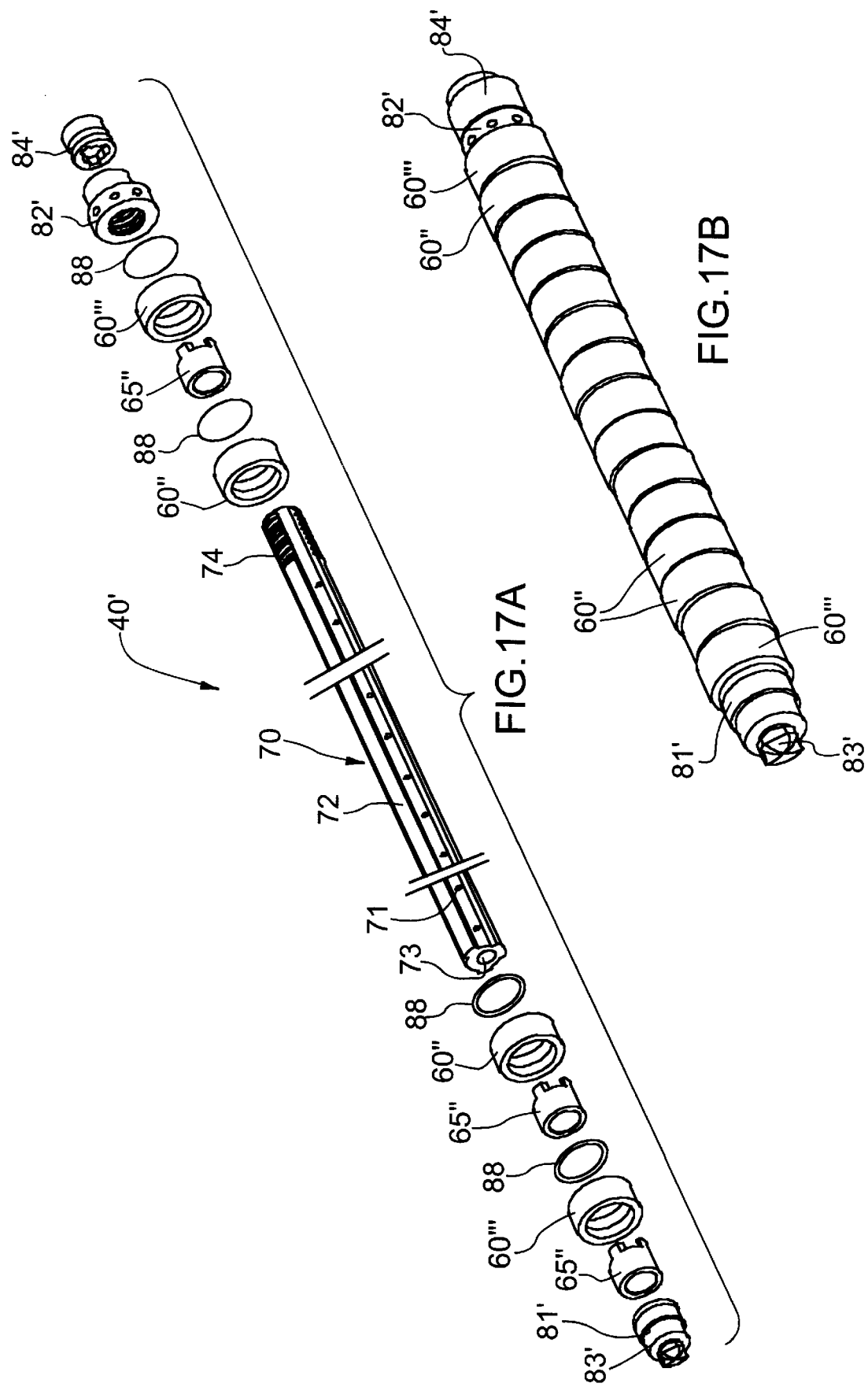

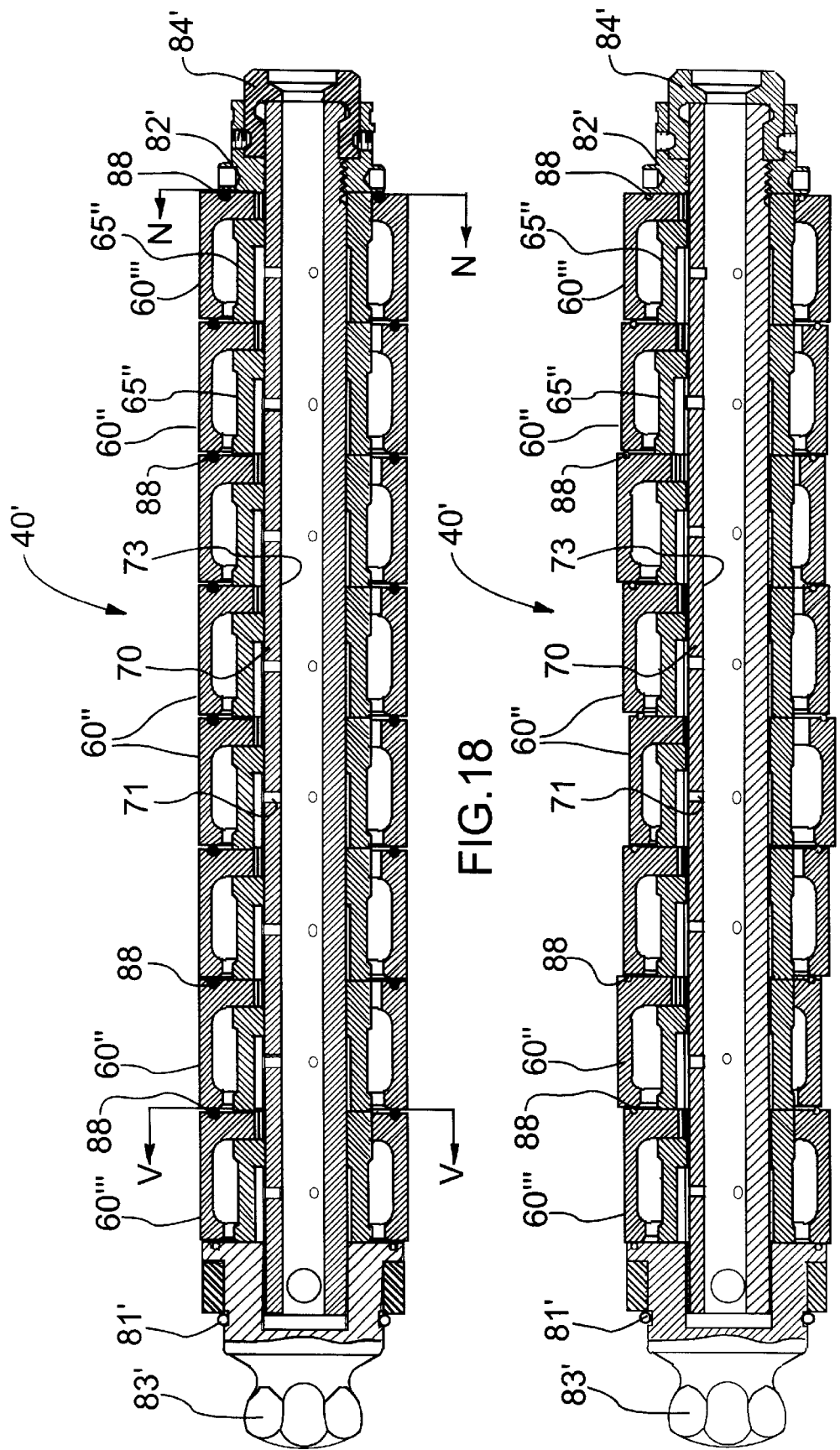

RING ROLLER FOR HIDE SPLITTING PROCESS

REFERENCE TO RELATED APPLICATION

This is a formal application based on and claiming the benefit of provisional application Ser. No. 60/175,713, filed Jan. 12, 2000.

BACKGROUND OF THE INVENTION

1. Field of the Invention

This invention relates to leather splitting equipment for animal hides, and especially to a hide feeding mechanism having an upper transport (gauge) roller, and a lower ring (section) roller resting on an elastic roll (rubber roll commonly used). In the following, whenever the terms pelt or hide are used, it is understood that both pelt and hide are included in the particular description.

2. Description of the Prior Art

In the leather tanning field, an important distinction exists between the upper part of the hide, which is called grain leather, and the lower part of the hide, which is called the split Splitting machines 1 are commonly used to separate these two layers (FIGS. 1 to 8B generally show known art). To achieve uniform grain thickness during splitting, the upper transport (gauge) roller 2 is set to the desired distance from the band knife 3 sharp edge. The band knife is sildingly held between an upper knife jaw 15 and a lower knife jaw 16. A ring jaw plate 17 holds ring jaw inserts 12, for scraping flesh from a ring roller 4.

To achieve successful transport of the hide, the lower feed roller 4 (or "ring roller") has to have a resilient mounting and the outer periphery surface has to be capable of deviating from the straight line of its rotation axis. The ring roller 4 rests on the rubber roller 5 and has a set of rings 6 arranged on a shaft 7. The ring roller works in tandem with the gauge roller (top feed roller) to pull and spread the hide 8 towards the traveling band knife 3. A user-friendly ring roller facilitates the leather splitting process via a sturdy construction, lengthy service life, minimal downtime and minimal maintenance.

In the past, many manufacturers have made simple and "economical" section rings 6 from various types of brass, bronze & steel material (FIGS. 2A to 2C). These friction driven section rings were assembled on a round rod or shaft 7 and kept together only with end washers 9 and adjustment nuts 10. This type of section ring was preferred by many splitters given the low overall manufacturing cost of the product. Nevertheless, this smooth, friction-driven ring roller had two apparent major drawbacks: insufficient pulling and spreading of wet and greasy lime pelts, and no means to provide a controlled gap between individual section rings.

Since slippery & greasy hides have a tendency to slide with the band knife traveling direction in lime splitting, feed roller manufacturers originally provided a 2/3 offset gauge roller corrugation 11. To further counteract this sliding effect section rings 6' were notched in one direction only (FIGS. 3A to 3C). Unfortunately, this single direction style of section ring notching did not improve spreading of the lime pelt during in-feeding. The constant slide effect also caused the rings to migrate in the direction of the band knife travel. Section ring "lock up" would occur as the individual rings became tightly grouped. These rings would "lock up" (FIGS. 4A and 4B) when the ring roller 4 was excessively "tight" or when flesh was trapped between section rings 6'. "Locked up" section rings create problems during splitting, including "suck-outs" (an area of grain leather of extreme and uneven thickness), and "wraparounds" (when flesh is trapped between section rings and pulled 'around' the ring roller).

To improve the pulling of wet & greasy lime pelts, manufacturers have installed a positively driven ring roller 4' in lime splitting machines (FIGS. 5A to 5D). This ring roller is equipped with an "X-shaped" drive rod 7' that ensured all rings 6" turn in unison. This style of ring roller has two advantages with respect to splitting performance: even pulling of slippery and greasy limed hides, and level wear of the rubber roller. The insides of the section rings 6" have to be cleaned on a regular basis to maintain their freedom of movement and rotation. Unfortunately, the "X" drive design has the same apparent major drawback as the original "economical" style ring roller—the lack of a controlled gap between individual section rings to counteract the constant slide effect in the band knife direction.

Lock-up of the section rings also occurs if the end nuts 10 are not properly adjusted. Two improper modes of adjustment includes: over-tightening of the assembly, restricting section ring movement, and insufficient tightening of the end nuts, causing an excessive gap between rings through which flesh could enter.

Serious problems occur with other parts of the splitting machine when section rings are "locked up" or do not have the proper range of motion (FIG. 6). For example, the band knife 3 may run into the ring roller 4, the ring jaw inserts 12 wear out prematurely, and the section rings 6 force uneven wear of the rubber roller 5.

SUMMARY OF THE INVENTION

In view of the preceding, it is an object of the invention to provide a hide splitting machine having a ring roller which permits hide splitting under severe conditions regarding hide wetness and greasiness, but which does not lock up the individual rings of the ring roller, nor permits any foreign substances to enter any gaps between individual rings of the ring roller.

In the invention, a hide splitting machine is provided, which comprises an in-feed table leading in to a ring roller/gauge roller combination having a traveling band knife arranged to split hides fed into a gap created between the ring roller and the gauge roller. The ring roller preferably rests on an elastic roller, for example a rubber roller. Lime pelt or wet-blue pelt is fed onto the in-feed table and onto the ring roller, which grips the pelt and transports it through the gap between the ring roller and the gauge roller. The band knife is held behind the ring roller/gauge roller, for example by an upper and a lower knife jaw, so that the hide is split into an upper grain part and a lower flesh split. Care must of course be taken to put the pelt with its flesh side down on the in-feed table. A ring jaw plate and insert is preferably arranged to scrape flesh and grease off the ring roller.

The ring roller comprises a drive shaft, a plurality of spacers and a plurality of rings (section rings). The drive shaft has a hollow center, i.e. the drive shaft is tubular in configuration. Further, the drive shaft has a plurality of axial drive bars protruding in a radial direction from the drive shaft, and a plurality of first radial holes connecting the outer surface of the drive shaft with the hollow center. The first radial holes are preferably arranged on the drive shaft between the protruding drive bars. The hollow center of the drive shaft is connected to a pressurized fluid system at one end of the drive shaft and sealed at the other end. In this way, when pressurized fluid, e.g. water or air, is fed into the drive shaft, it flows out of the drive shaft to the spacers and the rings. The ring roller assembly thus comprises individual section rings, loosely arranged on the drive shaft and cooperating with the "three prong" spacers and their inner spline which, in turn, cooperates with the splined drive shaft. The rings have a substantially cylindrical outer surface, optionally having pelt gripping notches formed therein, and a smaller inside diameter. The rings have one open end and one end having an end wall (web) with a central through hole for the drive shaft to pass through. The central hole further has drive notches arranged to cooperate with teeth (prongs) arranged on the spacers, as will be described later. The drive notches are advantageously arranged in a three notch configuration. The spacers have a large diameter which is smaller than the inside diameter of a ring. The spacers further have a first end with extending gap defining teeth (prongs), a second smooth end for contact engagement with the first end of an adjacent spacer, and a middle portion between the ends, the middle portion being splined and having a diameter which is smaller than the large diameter of the spacer. When a liquid is used as the fluid, the middle portion of the spacer has a plurality of second radial holes to allow the pressurized fluid to flow from the first radial holes of the drive shaft and out to the rings via the second radial holes. All spacers are slid over the drive shaft with their respective gap defining teeth (prongs) pointing the same direction. The plurality of axial drive bars (assembly shaft splines) protruding in a radial direction from the drive shaft are arranged to be engageable with the inner spline of each spacer. Thus, a domino effect is created, as a positive drive develops through spline engagement between the drive shaft and each spacer. The gap defining teeth of a spacer are arranged to extend through the central through hole of a ring, but not interfere with the drive shaft drive bars (splines) located in the drive notches (web )of the rings when the ring roller is assembled.

Thus, when the ring roller is assembled, a ring is slid onto the drive shaft, then a spacer followed by another ring etc. The gap defining teeth of the spacers make contact with an adjacent spacer to form a gap or space allowing the end wall of a ring to move axially inside this space, thus creating a pre-defined maximum gap between two adjacent rings of an assembled ring roller. When the pressurized fluid is made to flow into the ring roller, the fluid flows from the hollow center of the drive shaft, through the first radial holes of the drive shaft, through the second holes of the spacers and further out through the calibrated gaps between the rings. The gap will thus regulate the amount of fluid which escapes the ring roller per time period.

When using a gas as the fluid, the second holes are not needed. In fact, to optimize the fluid flow in this case, the roll assembly functions better without the second holes. The fluid flows between the spacer teeth (prongs) and out between the rings, in this case.

BRIEF DESCRIPTION OF THE DRAWINGS

Additional advantages, characteristics and details of the invention will be described or will become apparent in the following description of a preferred embodiment, as well as from the drawings, in which:

FIG. 2A is a schematic perspective side view of a section ring according to Prior Art, FIG. 2B is a schematic end view of a section ring according to FIG. 2A, FIG. 2C is a schematic partially sectioned side view of a ring roller assembled with rings according to FIG. 2A, FIG. 3A is a schematic perspective side view of a section ring according to Prior Art, showing grooved outer surfaces of the rings, FIG. 3B is a schematic end view of a section ring according to FIG. 3A, FIG. 3C is a schematic partially sectioned side view of a ring roller assembled with rings according to FIG. 3A, FIG. 4A is a sectioned partial view of a ring roller according to Prior Art, showing no gaps between the rings, FIG. 4B is a sectioned partial view of a ring roller according to Prior Art, showing flesh trapped in gaps between the rings, FIG. 5A is a schematic perspective side view of a section ring according to Prior Art, showing grooved outer surfaces of the rings and positive drive feature, FIG. 5B is a schematic end view of a section ring according to FIG. 5A, showing the cross-section of the drive shaft for illustration purposes, FIG. 5C is a schematic partially sectioned side view of a ring roller assembled with rings according to FIG. 5A, FIG. 5D is a schematic sectioned partial view of a ring roller according to FIG. 5C, showing the gap/no gap feature of the ring roller, FIG. 6 is a schematic sectioned side view of a Prior Art pelt splitting apparatus illustrating possible disadvantages with this equipment, FIG. 7A is a schematic perspective side view of a section ring according to Prior Art, showing grooved outer surfaces of the rings, positive drive feature and calibrated gap feature, FIG. 7B is a schematic end view of a ring roller assembled with rings according to FIG. 7A, FIG. 7C is a schematic partially sectioned side view of a ring roller according to FIG. 7B, FIG. 8A is a schematic sectioned side view of a Prior Art pelt splitting apparatus using a ring roller according to FIG. 7C, FIG. 8B is a schematic end view of a ring according to FIG. 7B, showing where solid lime builds up during pelt splitting use, FIG. 9A is a schematic exploded perspective side view of a ring roller according to a first embodiment of the invention, for use with pressurized liquid, FIG. 9B is a schematic perspective side view of the assembled ring roller according to FIG. 9A, FIG. 9C is a schematic side view of the ring roller according to FIG. 9B, FIG. 9D is a schematic sectioned side view of the ring roller according to FIG. 9C, FIG. 9E is a schematic side view of the ring roller according to FIG. 9B, showing the rings in different locations relative the spline shaft, FIG. 9F is a schematic sectioned side view of the ring roller according to FIG. 9E, FIG. 9G is a schematic partially sectioned end view of the ring roller according to FIG. 9E, seen from line I—I of FIG. 9D, FIG. 12A is a schematic perspective side view of a section ring according to the invention, showing grooved outer surfaces of the rings, positive drive feature and calibrated gap feature, FIG. 12B is a schematic end view of a ring roller according to the invention assembled with section rings according to FIG. 12A, FIG. 12C is a schematic sectioned side view of a ring. roller according to FIG. 12B, FIG. 12E is a schematic sectioned side view of a ring roller according to FIG. 12C, showing the liquid flow inside the ring roller, FIG. 12F is a schematic sectioned end view of a ring roller according to FIG. 12D, along the line II—II of FIG. 12E, FIG. 12G is a schematic sectioned end view of a ring roller according to FIG. 12D, along the line III—III of FIG. 12E, FIG. 12H is a schematic sectioned end view of a ring roller according to FIG. 12D, along the line IV—IV of FIG. 12E, FIG. 14A is a schematic side view of a hollow spline shaft according to FIG. 9A, FIG. 14B is a further schematic side view of a hollow spline shaft according to FIG. 9A, FIG. 14C is a schematic end view of a hollow spline shaft according to FIG. 9A, FIG. 14D is a schematic sectioned side view of a hollow spline shaft according to FIG. 9A, FIG. 17A is a schematic exploded perspective side view of a ring roller according to a second embodiment of the invention, for use with pressurized gas, FIG. 17B is a schematic perspective side view of the assembled ring roller according to FIG. 17A, FIG. 18 is a schematic sectioned side view of the ring roller according to FIG. 17B, FIG. 19 is a schematic sectioned side view of the ring roller according to FIG. 17B, showing the ring rollers in different positions relative the spline shaft.

DETAILED DESCRIPTION OF THE PREFERRED EMBODIMENTS

Figure 1:
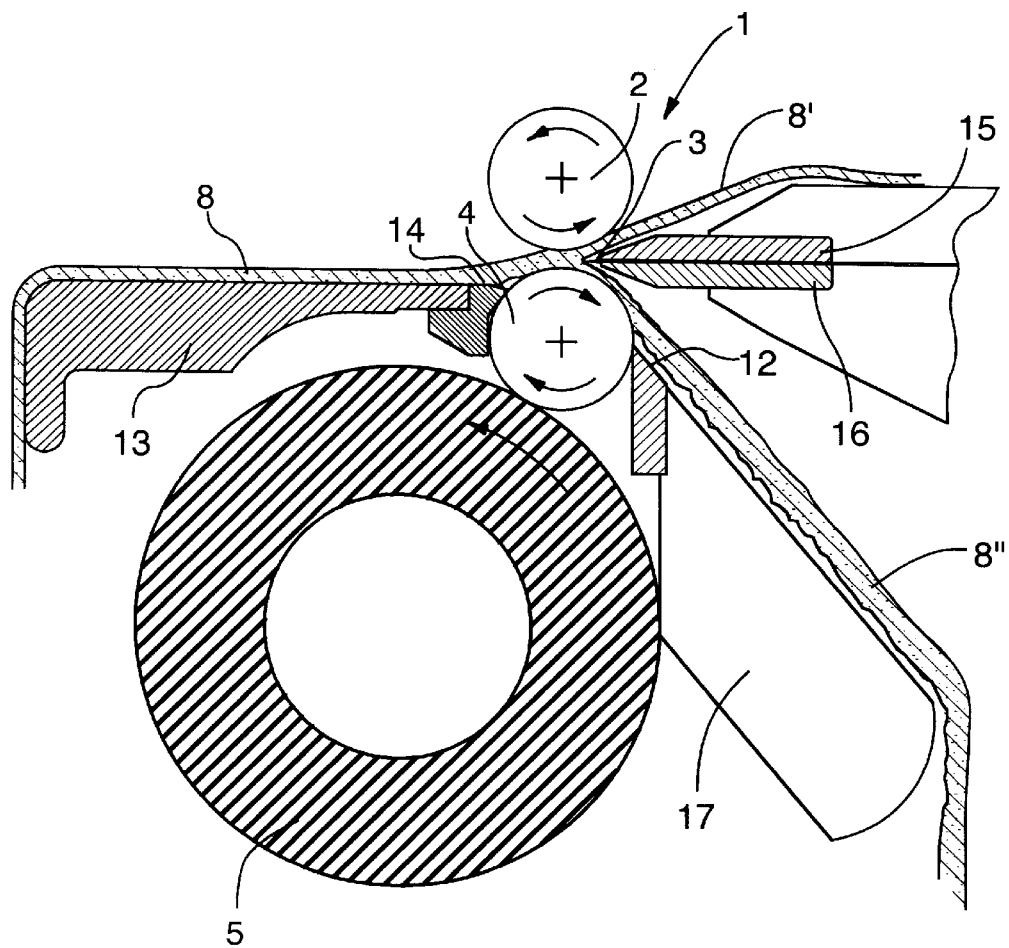
FIG. 1 is a schematic sectional side view of a pelt splitting apparatus according to Prior Art.

According to one embodiment of the invention, as shown in FIGS. 9A to 9G, a ring roller 40 with "calibrated gaps" provided by a plurality of spacers 65 arranged on a main shaft 70 between individual rings 60 has the advantages of eliminating section ring 'lock up' and facilitating splitting of limed hides to close gauge tolerances through full substance width and length.

For positive drive, the shaft 70 is profiled to correspond to inner holes of the spacers, and the spacers have prongs 66 which, in turn, gripping cutouts 63 in side walls 61 of the rings 60. The ring has a smaller diameter hole 64 arranged in the side wall 61, and a large diameter hole 69 arranged at the opposite side of the ring, the smaller diameter hole cooperating with the outer diameter of the shaft 70. The aforementioned notches 110 are arranged on an outer substantially cylindrical part 62 of the ring. The left hand and right hand angled notching 110 provides proper pulling and spreading of limed hides passing through the "pressure zone". The spacers/inner rings 65 prevent the "lock up" of individual rings 60 while maintaining tolerable levels of upward and downward ring movement. Therefore, limed hides with uneven weights or thickness can be split with greater uniformity and to closer tolerances.

The design of the ring roller 40 with "calibrated gaps" between individual rings 60 enables leather splitting in the most adverse conditions—extremely wet & heavy loads. Below the heavy stock, the ring roller is under large amounts of localized working pressure trying to twist the individual rings. However, feeding resistance forces the driven rings to center themselves with the center of rotation axis.

Fluid supplied during lime splitting, to rinse the in-feed table 13 tip 14, rubber roller 5 surface and ring roller 40 outer surface, gathers around the outer surface of the section rings 60 (FIGS. 8A and 8B). The water is traditionally supplied externally to the ring roller. For previously used splitting machines, each controlled gap separating the individual rings becomes a gateway for water flowing inside the ring roller. As lime splitting production continues, the water surrounding the outer surface of the section rings contains greater amounts of lime and lime particles begin to flow through the controlled rings gaps. As lime and grease accumulate within the ring roller a new solid substance forms. This solid debris typically comprises lime, grease, fat and flesh particles, which cannot escape through the calibrated gaps between individual rings but continue to build up within the ring roller. Without regular cleaning and maintenance, the performance of the section roller is severely compromised by the formation of a restrictive 'solid lime core' within the ring roller.

A ring roll 40 according to the invention (FIGS. 9A to 9G) further comprises a single, hollow spline shaft 70, preferably made of bronze or other suitable material. The shaft preferably has end threads 74, for attachment of lock nuts or similar. The end threads according to the invention are cut directly into the splines thereby creating an interrupted thread of large diameter, as opposed to the known art where the threads were cut into a smaller diameter end part of the shaft, which created a weaker spot with a higher possible breakage risk. Regularly spaced holes 71 are formed in the spline shaft, for fluid exit from the hollow center. The splines are designated 72 and the longitudinal inner hole is designated 73. The spacers 65 have radial holes 67 corresponding to the placement of the regularly spaced holes of the shaft 70, when the ring roll is assembled. The spacers 65 further have axial through holes 68 to cooperate with the shaft 70. The spacers/inner rings 65 and outer section rings 60, 60' are constructed so that a designed and defined space exists between each neighboring outer ring (thus, the same gap exists between all outer rings when assembled), and are placed on the spline shaft to make up the ring roller. Special end rings 60' cooperate with the end spacers 65, so that the end rings have very little radial play relative the shaft 70 and the spacer, see FIG. 9G. The end rings have gripping cutouts 63' in side walls 61' of the rings, the gripping cutouts being narrower than the gripping cutouts of the "normal" rings 60. The rings are held together on the spline shaft with lock nuts 80, 80', 82, 85, 85'. Pressurized water, or other gaseous and/or liquid fluid is injected through an inlet adapter 84 arranged at one end of the spline shaft. The ring roller 40 is shown with all rings aligned in a straight configuration in FIGS. 9C and 9D, and with a configuration adapted to a pelt having differing thickness along its width in FIGS. 9E and 9F.

Figure 10:
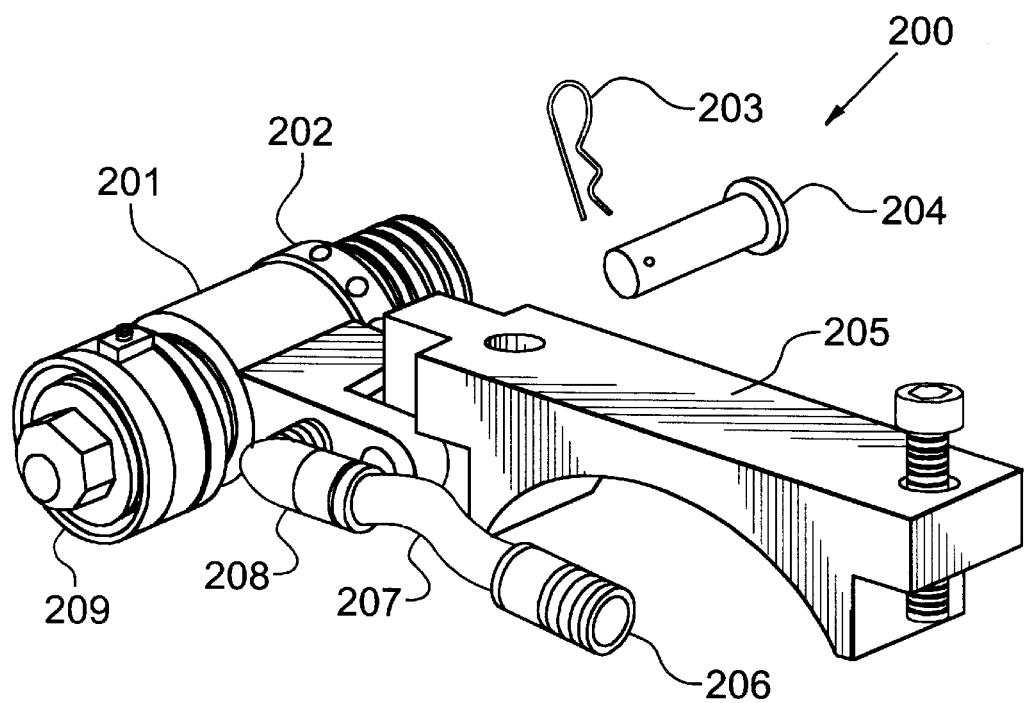
FIG. 10 is a schematic perspective side view of a fluid access device and ring roller holder for the fluid access end of a ring roller according to the invention.
Figure 11:
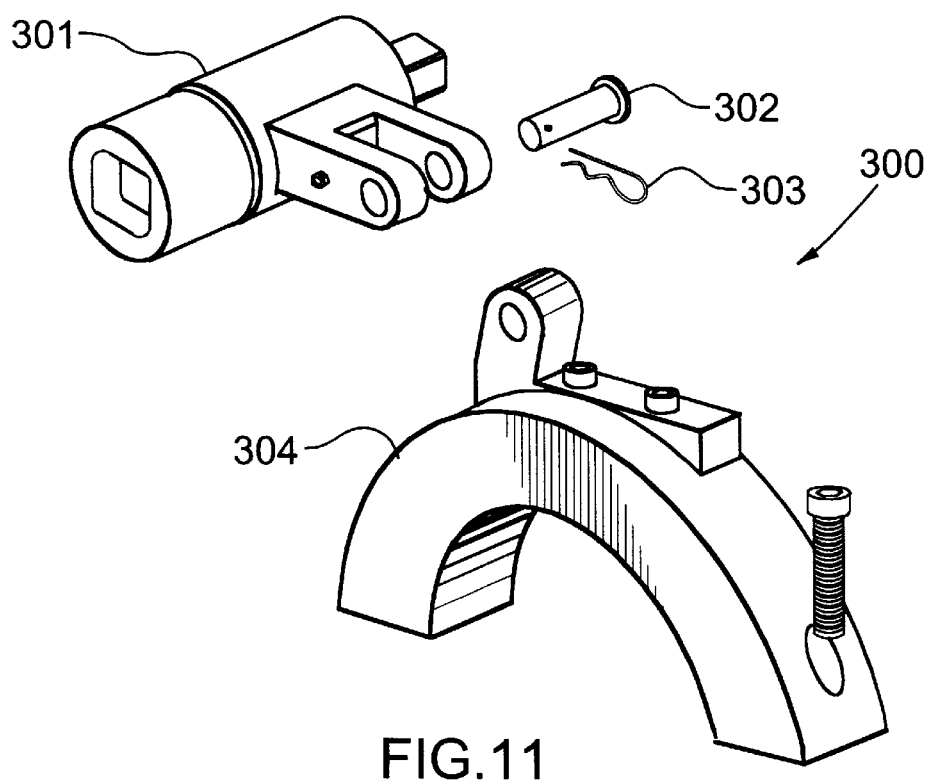
FIG. 11 is a schematic perspective side view of a ring roller holder for the non-fluid entrance end of the ring roller according to the invention.

The inlet adapter is connected to a water, or other gaseous and/or liquid fluid inlet unit (FIG. 10). The inlet unit advantageously has a first pivot arm 201, which has a lock nut 202 for cooperating with the inlet adaptor 84. Further, the first pivot arm is pivotably fastened to a first rubber roller clamp 205 with a first fastener, preferably a pin 204 and a hitch pin clip 203. The pressurized fluid enters the inlet unit 200 preferably via a straight quick-connect fitting 206 attached to the pivot arm via a tube 207, preferably a polyethylene tube, and an elbow quick-connect fitting 208. A ring roller driver adaptor 83 fastened on the opposite end of the spline shaft 70, compared to the Inlet adapter 84, is connected to a splitting machine ring roller drive unit 300 (FIG. 11). The drive unit preferably has a second pivot arm 301, for cooperation with the ring roller driver adaptor 83, and is pivotably fastened to a second rubber roller clamp 304 with a second fastener, preferably a pin 302 and a hitch pin dip 303. The completely assembled ring roller is then used as a component Installed in leather splitting equipment, and can be used for any similar application. Pressurized gaseous and/or liquid fluid is forced through the spline shaft, travels through the holes in the spline shaft into the ring roller cavity, and is expelled through the spaced openings designed between the outer rollers. The flow rate is determined by the pressure of the gaseous and/or liquid fluid and also by the size of the space between the outer rings. This continuous flow of gaseous and/or liquid fluid provides a flow barrier to any external lime, flesh, fat, and/or grease combination that could enter the ring roller assembly. Therefore, the core of the ring roller assembly remains clean, and no time, fat, flesh and/or grease mixture will enter the ring roller cavity, no lime, fat, flesh and/or grease mixture will become embedded in the cavity, and no lime, fat, flesh and/or grease mixture will create the problems associated with other types of ring roller equipment.

The PRO-SPLIT™ ring roller 40 is an example of a hide transport device comprising of a hollow spline shaft 70, preferably made of bearing bronze or other suitable material. The metallic inner ring 65, preferably made of bearing bronze or other suitable material, functions as a spacer and driver, and the metallic outer section ring 60, preferably made from thermo-chemically hardened magnetic stainless steel, or other suitably treated metallic material or other suitable material, functions as a transport roller (FIG. 9A and 9B). The outer ring is fitted onto the inner ring and then these fitted rings are positioned on the hollow spline shaft to make the complete ring roller.

Figure 12D:
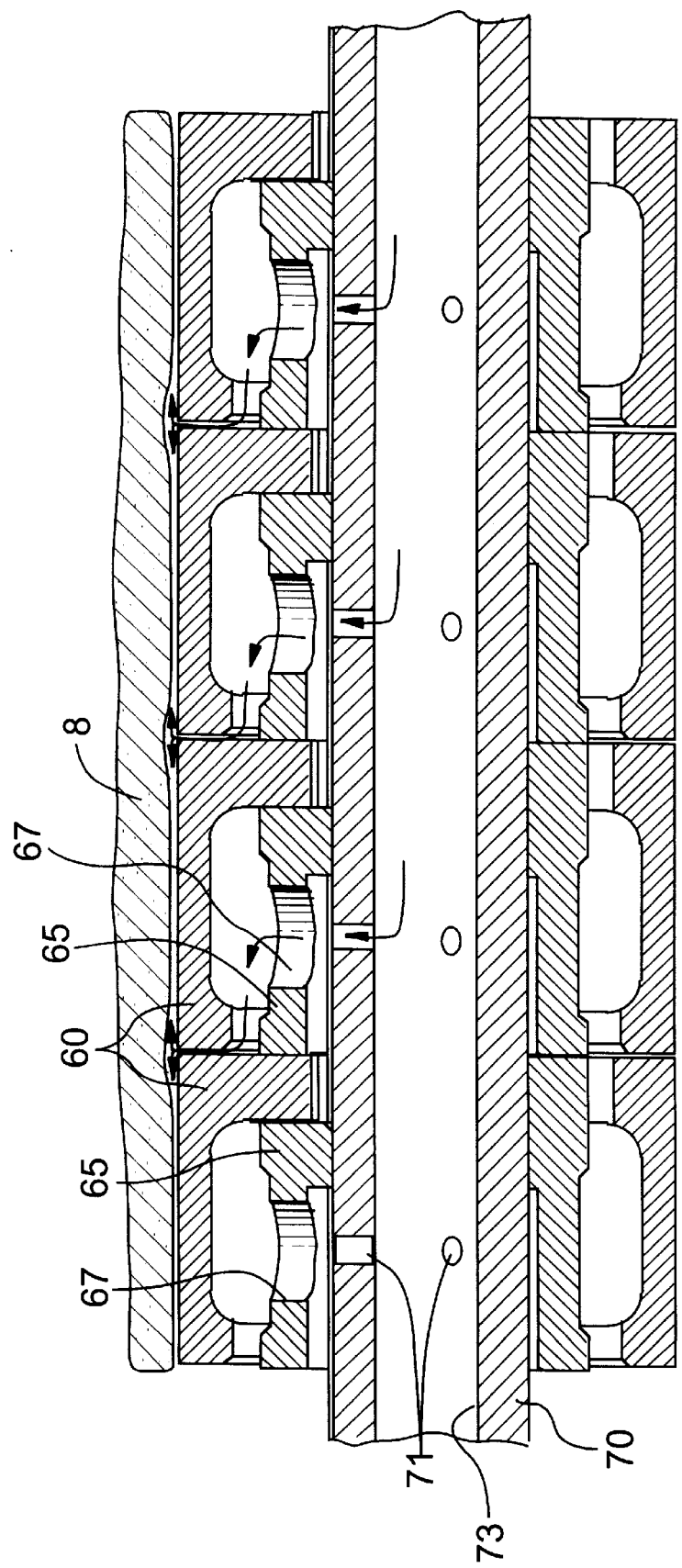
FIG. 12D is a schematic sectioned side view of a ring roller according to FIG. 12C.

Left hand and right hand angle notching 110 provides proper pulling and spreading of limed hides passing through the "pressure zone" (FIGS. 12A to 12C). The inner rings/spacer-drivers 65 maintain the calibrated gaps and prevent the "lock up" of individual outer rings while maintaining tolerable levels of upward and downward outer ring movement. Therefore, limed hides with uneven weights or thickness can be split with greater uniformity and to closer tolerances.

The PRO-SPLIT™ ring roller conveys pressurized water, or other gaseous and/or liquid fluid, through the hollow spline shaft 70, through the holes 71 in the spline shaft, through the holes in the inner rings/spacers 65 and then through the narrow open space formed by the boundary of the inner 65 and outer ring 60, 60' (FIGS. 12A to 12C). The positive gaseous and/or liquid fluid flow continues through the calibrated gaps in an outward direction from the ring roller and prevents accumulation of lime, flesh, fat, and/or grease, within the ring roller cavity. Since other ring roller technology uses an external water rinse, the individual section rollers can 'lock up' or bind with each other, thereby reducing the accuracy of splitting. The invention is a ring roller consisting of individual outer section rings and inner rings, also called spacer-drivers, installed on a single spline shaft. The shaft has a hollow circular cavity 73 for its full length and radial holes 71 are drilled at intervals along the shaft. This design allows pressurized water, or other gaseous and/or liquid fluid, to flow through the hollow core of the spline shaft and out through the holes. The water, or other gaseous and/or liquid fluid then flows through the open annular space between the outer and inner ring boundary, and continues its flow through the calibrated gaps between the outer section rings 60, 60'.

Figure 13:
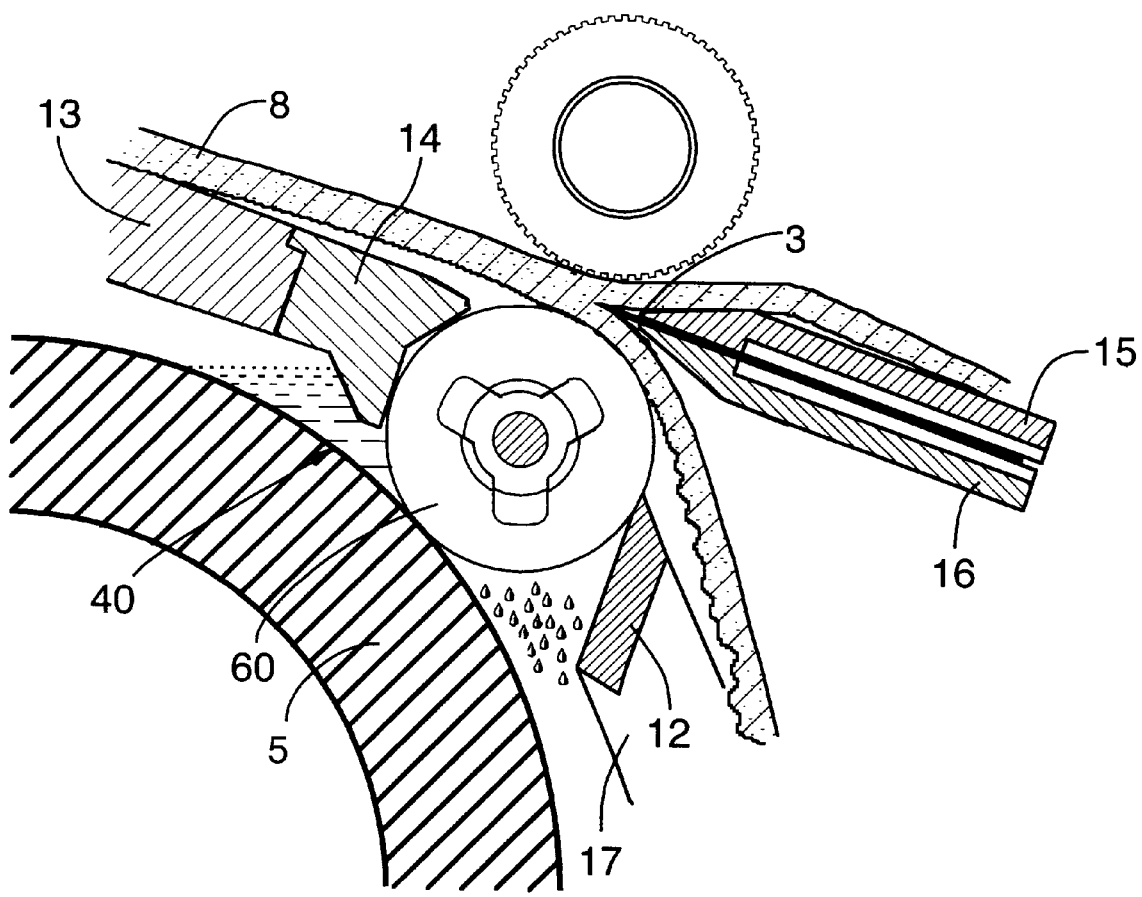
FIG. 13 is a schematic sectioned side view of a pelt splitting apparatus according to the invention.

Pressurized water, or other gaseous and/or liquid fluid, is pumped into the hollow spline shaft. When the free water, or other gaseous and/or liquid fluid flow meets resistance at the driver adaptor end of the shaft, water, or other gaseous and/or liquid fluid, begins to return to the water supply end (FIG. 12C). At this moment, the water, or other gaseous and/or liquid fluid, begins to flow through the radial holes drilled in the shaft, through the inner ring and then between the narrow concentric opening made by the boundary of the inner and outer ring. The high gaseous and/or liquid fluid pressure, and continuous outward flow through the calibrated gaps between the individual outer rings, prevents lime, grease, fat and/or flesh from entering the ring roller. Therefore, lime, grease, fat and/or flesh cannot accumulate and solidify within the ring roller, thereby substantially reducing the need for planned cleaning and repair/maintenance, prolonging the service life of the ring roller, and facilitating the process of proper and accurate hide splitting (FIG. 13).

A "self-cleansing" ring roller remains completely clean and free of internal debris during lime splitting operations. The "self-cleansing" ring roller is specifically designed to allow the use of a continuous cleaning agent within the entire working width of the roller assembly—the main area responsible for proper section ring movement and rotation. The ring roller is equipped to handle water, or other gaseous and/or liquid fluid, as the cleaning agent because water is constantly used during lime splitting to wash away lime deposits from the traveling bandknife and other machine components.

Accordingly, several objects and advantages of the invention are as follows:

The redirecting of cleaning water, or other gaseous and/or liquid fluid, from the external part of the ring roller inwards to the internal part of the ring roller outwards. An inner section ring made from bronze or other suitable material, machined to a predetermined size and tolerance, with radial holes in the wall of the inner section ring to allow passage of gaseous and/or liquid fluid. The outer section ring, made from thermo-chemically hardened magnetic stainless steel, or other suitably treated metallic material or other suitable material, machined to a predetermined size and tolerance. The inner and outer ring work together to control the size of the designed gap between outer section rings and simultaneously the inner ring drives the outer ring. The hollow spline shaft, made from bronze or other suitable material, drives the inner rings. The hollow spline shaft has regularly spaced radial holes drilled in the shaft wall. The unique fluid inlet unit (FIG. 10) comprising the pivot arm, adjustment sleeve assembly and the unique fluid flow fitting, all of which allows gaseous and/or liquid fluid to flow into the ring roller. A modified ring roller drive unit and clamp (FIG. 11) which allows proper installation of the ring roller and also provides a positive drive for the ring roller. The hollow spline shaft with regularly spaced radial holes drilled in the shaft wall, the inner and outer section rings designed to allow a constant, predetermined calibrated gap between left hand and right hand notched outer section rings. The continuous and consistent pressurization of the cleaning water, or other gaseous and/or liquid fluid. The continuous flow of gaseous and/or fluid from inside the ring roller through the individual gaps between section rings. The continuous cleaning of the individual inner rings and outer section rings. The prevention of solid lime, fat, flesh, and/or grease build-up within the ring roller given the supply of constant water, or other gaseous and/or liquid fluid, pressure throughout the entire ring roller. The elimination of preventative maintenance, requiring disassembly of the ring roller. The constant, equally calibrated gap between each outer ring eliminates section ring 'lock-up'. The splitting of pelts and/or hides to closer tolerances throughout the complete width and length of the pelt(s) and/or hide(s). Useful service life of the ring roller is maximized. Splitting process downtime and/or mechanical failure is minimized.

FIG. 1 is a schematic diagram of traditional hide splitting equipment 1. The ring roller 4 traditionally has consisted of a solid shaft upon which are assembled a number of outer section rings 6. The ring roller transports the flesh and fat portion of the hide for splitting. The traveling band-knife 3 separates the flesh portion 8" of the hide from the grain 8' and the ring roller transports this flesh split. The traditional ring roller is intermittently and externally cleaned with rinse water. This intermittent, external rinse does not properly clean the internal area of the ring roller. Therefore, significant downtime is incurred as the complete ring roller is disassembled and cleaned regularly. The lack of a regular cleaning agent within the total working length of the ring roller results in section ring 'lock up'. The 'lock up' of individual section rings leads to premature wear of the ring roller, premature wear of other splitting machine components (i.e. ring jaw inserts 12, band-knife 3, rubber roller 5) and reduces the accuracy of splitting. Regular maintenance and cleaning of the complete ring roller prevents section ring 'lock up' and minimizes splitting process problems associated with section ring 'lock up'.

The ring roller according to the invention for use with a pressurized liquid, preferably water, consists of the details in FIGS. 9A to 9G, FIG. 10, FIG. 11, FIGS. 12A to 12D, FIGS. 14A to 14D, FIGS. 15A and 15B, FIGS. 16A to 16H. The roller is designated the PRO-SPLIT™ ring roller.

Figure 15A:
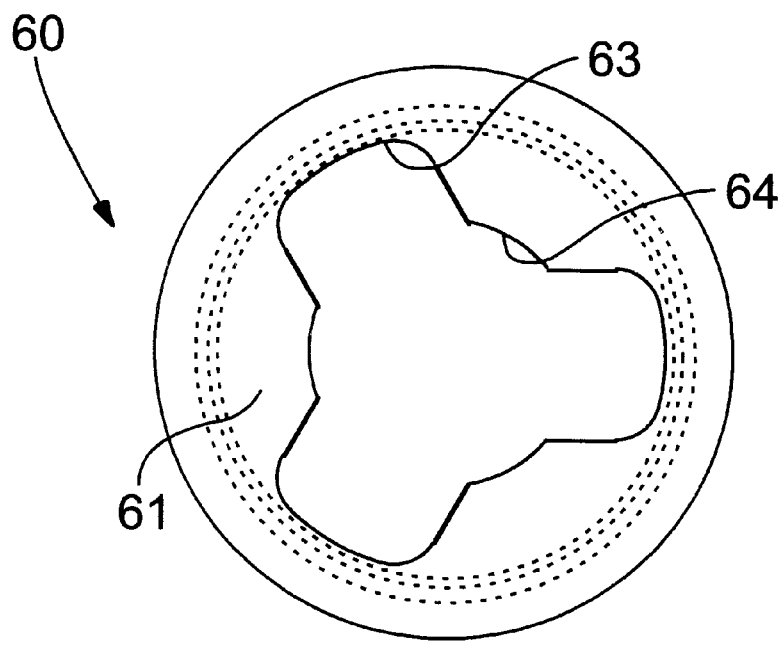
FIG. 15A is a schematic end view of a section ring according to FIG. 9A.
Figure 15B:
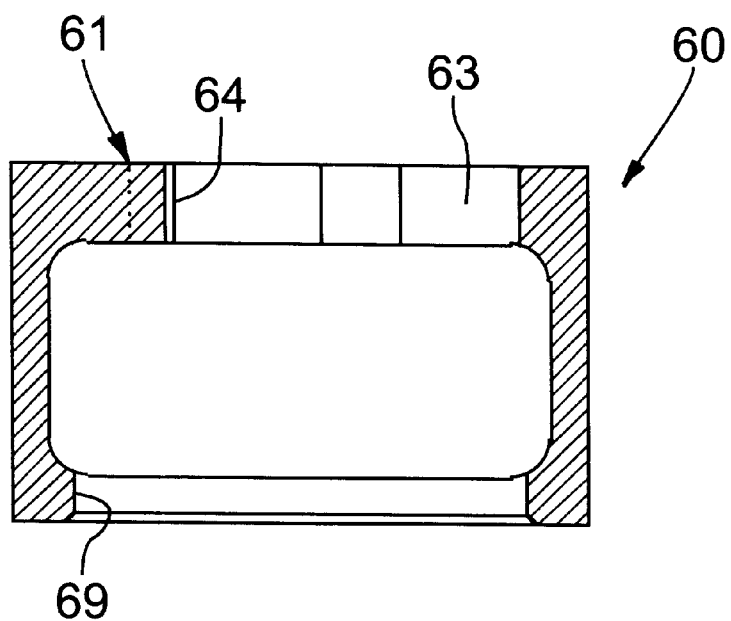
FIG. 15B is a schematic sectioned side view of a section ring according to FIG. 15A.
Figure 16A:
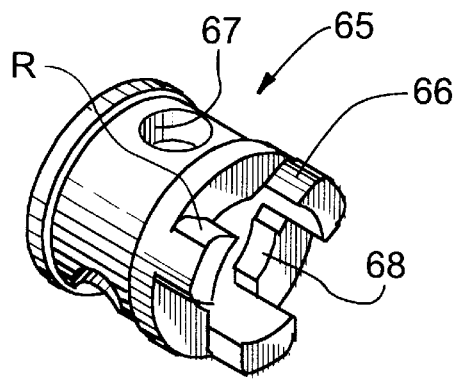
FIG. 16A is a schematic perspective view of an inner ring according to FIG. 9A.
Figure 16B:
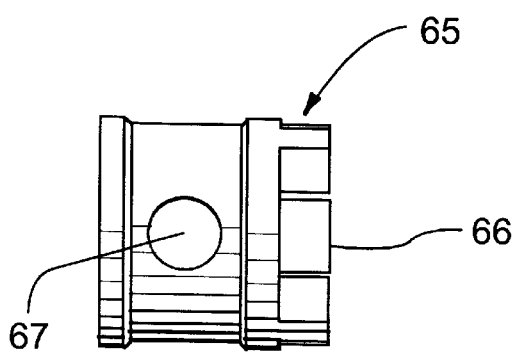
FIG. 16B is a schematic side view of an inner ring according to FIG. 16A.
Figure 16E:
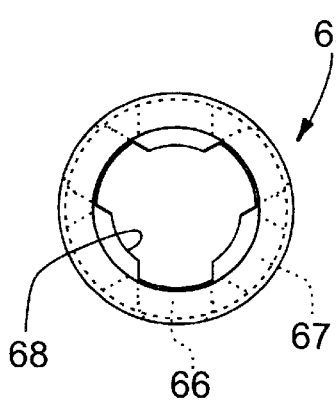
FIG. 16E is a schematic end view of an inner ring according to FIG. 16A.
Figure 16C:
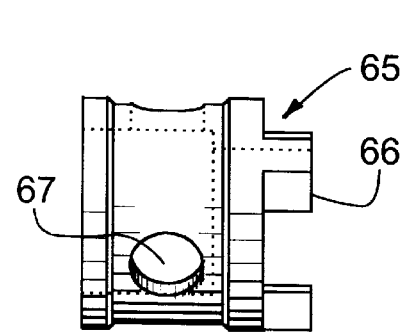
FIG. 16C is a further schematic side view of an inner ring according to FIG. 16A.
Figure 16F:
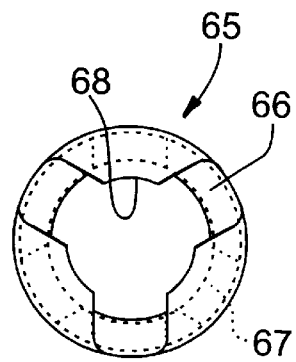
FIG. 16F is a further schematic end view of an inner ring according to FIG. 16A.
Figure 16D:
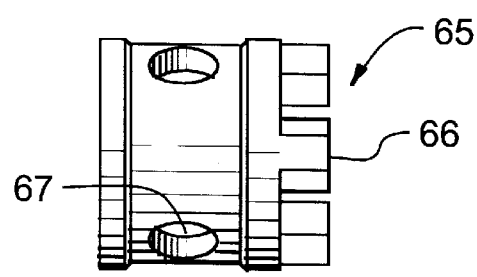
FIG. 16D is yet a further schematic side view of an inner ring according to FIG. 16A.
Figure 16G:
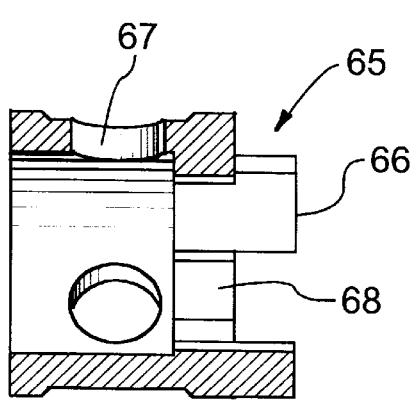
FIG. 16G is a schematic sectioned side view of an inner ring according to FIG. 16A.
Figure 16H:
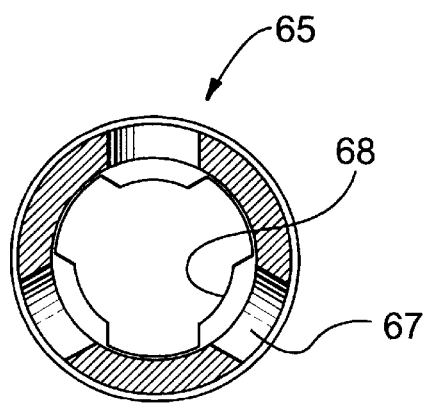
FIG. 16H is a schematic sectioned end view of an inner ring according to FIG. 16A.
Figure 21A:
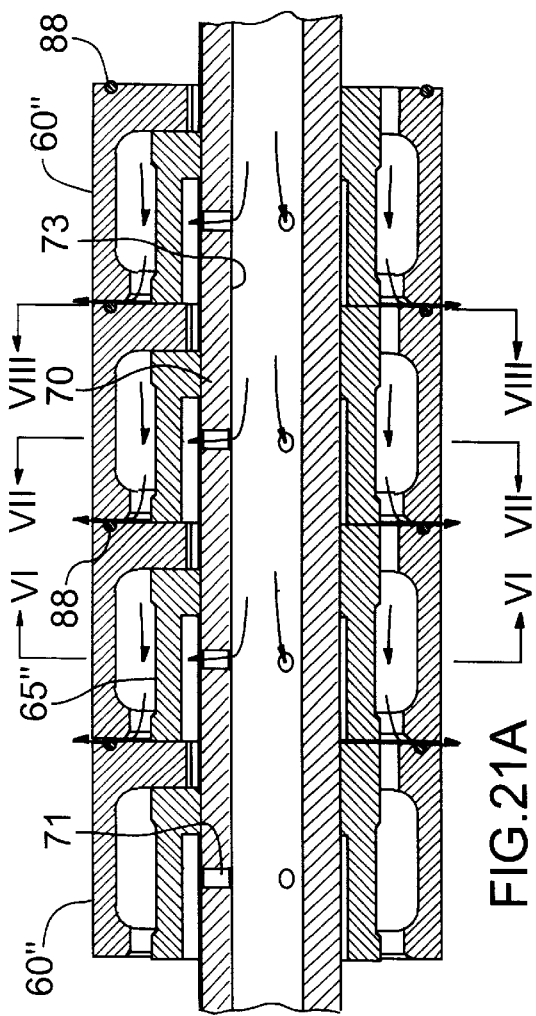
FIG. 21A is a schematic sectioned detail side view of the ring roller according to FIG. 17B, showing the gas flow inside the ring roller.
Figure 21D:
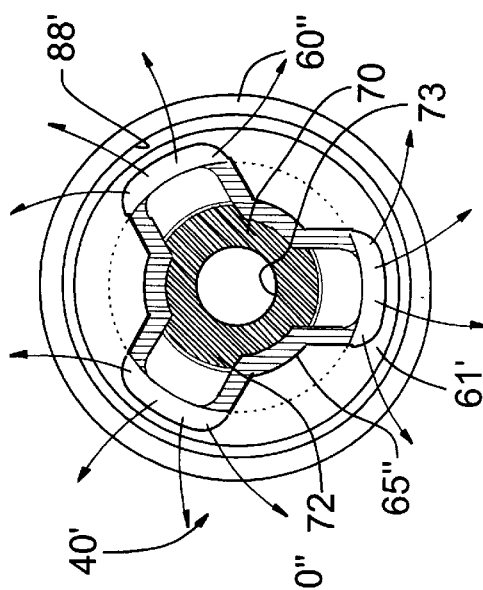
FIG. 21D is a schematic partially sectioned end view of the ring roller according to FIG. 21A, seen from line VIII—VIII.
Figure 21C:
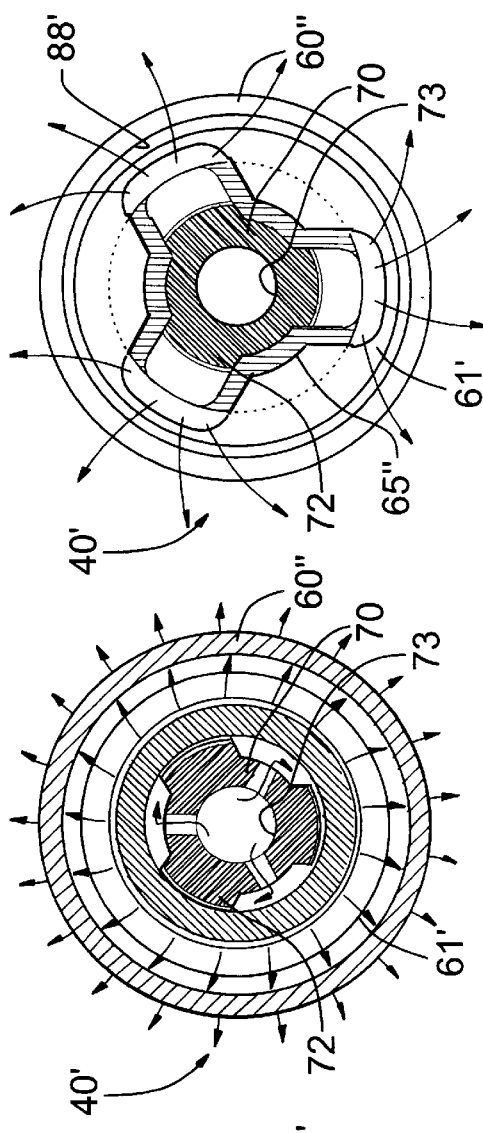
FIG. 21C is a schematic partially sectioned end view of the ring roller according to FIG. 21A, seen from line VII—VII.
Figure 20:
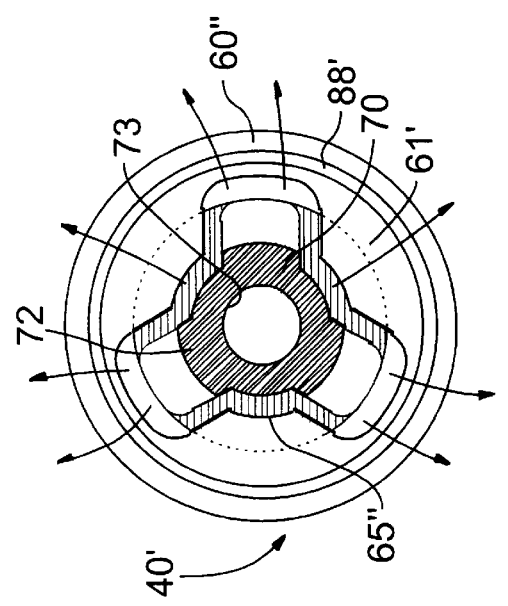
FIG. 20 is a schematic partially sectioned end view of the ring roller according to FIG. 17B, seen from line V—V.
Figure 21B:
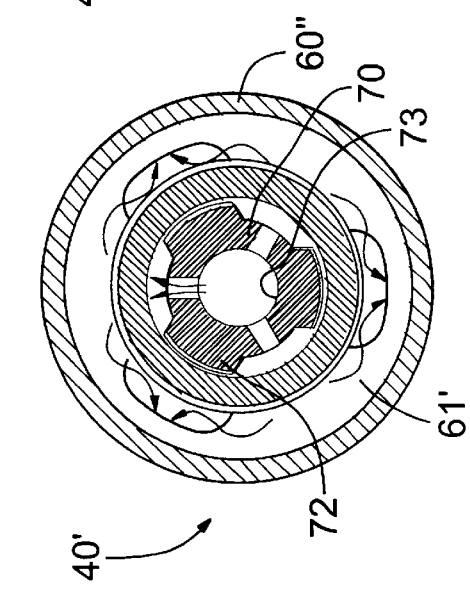
FIG. 21B is a schematic partially sectioned end view of the ring roller according to FIG. 21A, seen from line VI—VI.
Figure 22:
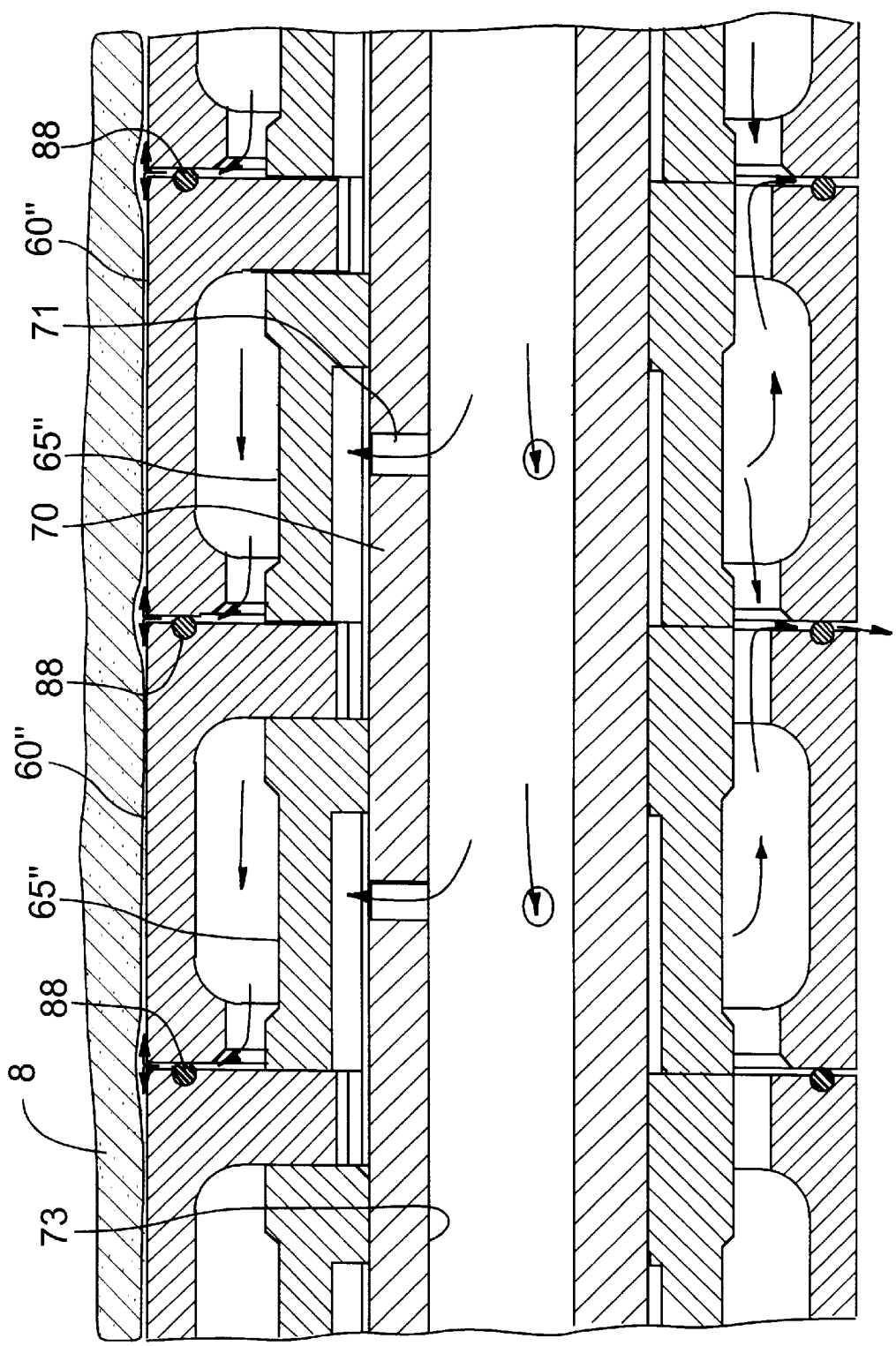
FIG. 22 is a schematic sectioned detail side view of the ring roller according to FIG. 21A, showing the gas flow in more detail.
Figure 23A:
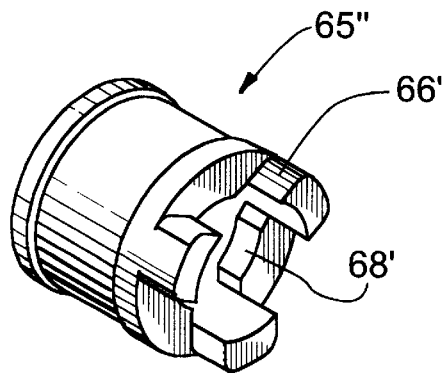
FIG. 23A is a schematic perspective view of an inner ring according to FIG. 17A.
Figure 23B:
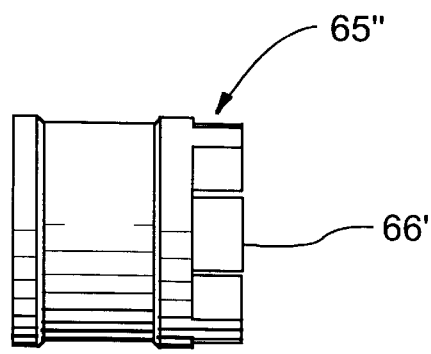
FIG. 23B is a schematic side view of an inner ring according to FIG. 23A.
Figure 23E:
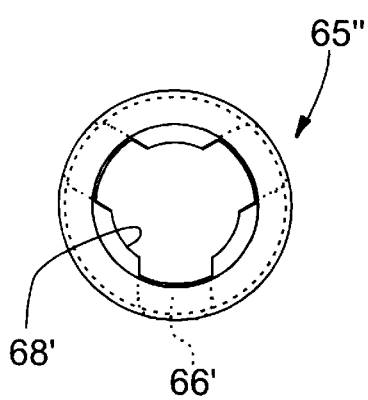
FIG. 23E is a schematic end view of an inner ring according to FIG. 23A.
Figure 23C:
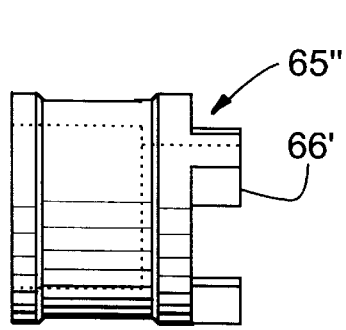
FIG. 23C is a further schematic side view of an inner ring according to FIG. 23A.
Figure 23F:
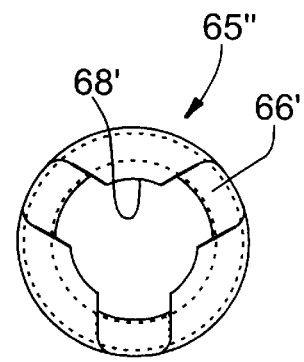
FIG. 23F is a further schematic end view of an inner ring according to FIG. 23A.
Figure 23D:
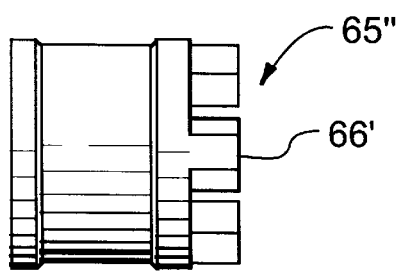
FIG. 23D is yet a further schematic side view of an inner ring according to FIG. 23A.
Figure 23G:
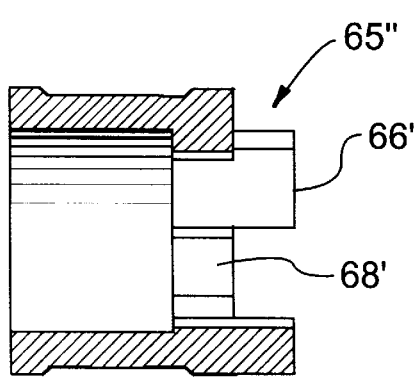
FIG. 23G is a schematic sectioned side view of an inner ring according to FIG. 23A.
Figure 23H:
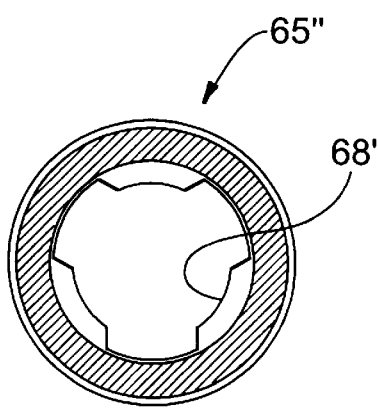
FIG. 23H is a schematic sectioned end view of an inner ring according to FIG. 23A.

FIGS. 14A to 14D show the hollow shaft 70 alone. FIGS. 15A and 15B show an outer ring 60 alone. FIGS. 16A to 16H show an inner ring/spacer 65 alone.

The ring roller assembly preferably comprises a driver adaptor 83, right hand notched section rings 60, bronze inner rings 65, a cored or hollow spline shaft 70 with radial holes 71 in the circumferential surface of the spline shaft, left hand notched section rings 60, a retaining nut 85, a female locking nut 80, two special smooth end section rings 60' and three locking set screws 81. The individual parts are assembled as shown in FIG. 9B, The actual sizes of the ring roller assembly will vary depending upon the size, make and model of a splitting machine. For example, complete ring roller assembly length can be three meters plus or minus fifty percent, outer section ring diameter can be 50 millimeters plus or minus 20 percent, outer section ring width can be 37.5 millimeters plus or minus 35 percent, inner section ring diameter can be 33 millimeters plus or minus 20 percent, and inner section ring width can be 37.5 half millimeters plus or minus 35 percent. The inner and outer section ring lengths are so designed to provide the adjacent outer section ring calibrated gap. All other ring roller components are sized appropriately to the above example. Any physical dimensions of the splitting machine is ultimately derived from the hide to be split.

The fluid inlet unit (FIG. 10), which preferably comprises a first pivot arm 201, an adjustment sleeve assembly 209 and a unique fluid flow fitting 206, 207, 208 fits into the female locking nut 80 fastened on the ring roller assembly 40. The fluid inlet unit is part of the invention and allows gaseous and/or liquid fluid flow into the ring roller assembly. The fluid inlet unit is secured to a modified non-driver side first rubber roller clamp 205. The fluid inlet unit may be secured to a specially designed bracket or clamp depending upon the size, make and model of a splitting machine.

The modified drive unit (FIG. 11) preferably comprises a second pivot arm assembly 301 and is attached to a modified driver side second rubber roller clamp 304. The modified drive unit is compatible with the ring roller invention.

The ring roller according to the invention, comprises the ring roller assembly and the fluid inlet unit, and is so designed as to maintain the continuous pressurized flow of gaseous and/or liquid flow from within the hollow spline shaft, through the ring roller assembly, and exiting through the constant, predetermined calibrated gaps between individual section rings. The pressurized water, or other gaseous and/or liquid fluid, injected directly into the hollow spline shaft to fill each section ring cavity, serves to prevent any lime solution, grease, flesh and/or fat from entering into the ring roller assembly. Accumulation of lime solution, grease, fat and/or flesh within individual section ring cavities is prevented, in order to maximize ring roller assembly service life, and to optimize splitting results and eliminate downtime from ring roller assembly manual cleaning and/or preventative maintenance.

The essence of the invention is continuous cleaning of the entire ring roller from within the ring roller using a pressurized gaseous and/or liquid fluid injected into a single hollow spline shaft equipped with regularly spaced radial holes in its wall. The invention also includes a unique fluid inlet unit, and regular, controlled, calibrated spacing between individual section rings to prevent section ring "lock up" and to allow continuous, controlled flow of pressurized gaseous and/or liquid fluid. This continuous ring roller cleaning process from within the ring roller assembly ensures that lime solution, grease, flesh and/or fat does not enter nor solidify within the internal area of the ring roller assembly.

A second embodiment of a ring roller 40' according to the invention, shown in FIGS. 17A to 23H, uses the same hollow shaft 70 as described earlier, but has section rings 60" which have seals 88 arranged between adjacent rings. The seal is preferably, but not exclusively, an O-ring of suitable size arranged in a groove 88' in the section rings 60", 60'". Furthermore, spacers 65", 65'". are used, which have no radial holes. The spacers 65" further have axial through holes 68' to cooperate with the shaft 70. The spacers have prongs 66' which, in turn, grip cutouts 63 in side walls 61 of the rings 60. A ring roller driver adaptor 83' is fastened on the opposite end of the shaft 70, compared to an inlet adapter 84'. This embodiment effectively reduces the flow of fluid through the ring roller, and is especially beneficial when using a gaseous fluid, for example air, as the ring roller flushing medium. Common technical features with the first embodiment of the invention retain the same reference numbers.

The spacers/inner rings 65" and outer section rings 60", 6'", are constructed so that a designed and defined space exists between each neighboring outer ring, are placed on the spline shaft to make up the ring roller. Special end rings 60'" cooperate with the end spacers 65", so that the end rings have very little radial play relative to the shaft 70 and the spacer, comparable to FIG. 9G. The rings are held together on the spline shaft with lock nuts 81', 82'. Pressurized water, or other gaseous and/or liquid fluid is injected through an inlet adapter 84' arranged at one end of the spline shaft. The ring roller 40 is shown with all rings aligned In a straight configuration in FIG. 18, and with a configuration adapted to a pelt having differing thickness along its width in FIGS. 17B and 19. FIGS. 17A and 17B show the ring roller according to the second embodiment in a disassembled and assembled state, respectively. FIGS. 20, 21A to 21D and 22 show the flow of the gaseous fluid through the ring roller 40' of the second embodiment, at various sections. The PRO-SPLIT™ ring roller, according to the second embodiment of the invention, conveys pressurized gas through the hollow spline shaft 70, through the holes 71 In the spline shaft, through the holes in the inner rings/spacers 65" and then through the narrow open space formed by the boundary of the inner 65" and outer ring 60", 60'" (FIGS. 20, 21A to 21D and 22). The inner ring/spacer 65" used specially for the gaseous fluid embodiment is shown alone in FIGS. 23A to 23H.

The invention has the following advantages:

An improved ring roller assembly which has a continuous gaseous and/or liquid flow within the entire assembly working width during the pelt and/or hide splitting process.

A designed calibrated gap between the moving section rings allows excess water, or other gaseous and/or liquid fluid, along with any debris contained within, to be released from the ring roller.

Water, or other gaseous and/or liquid fluid, exiting through a designed gap between the moving section rings prevents lime, flesh, grease, and/or fat from entering the ring roller.

An improved ring roller manufactured with a custom machined hollow drive shaft that has the ability to carry pressurized water, or other gaseous and/or liquid fluid.

A hollow spline shaft has spaced holes that allow water, or other gaseous and/or liquid fluid, to exit the hollow shaft and fill the internal area of each rotating section ring.

A designed calibrated gap between the individual section rings ensures the unrestricted upward and downward movement of each section ring within ring roller design parameters.

A designed calibrated gap between the moving section rings prevents the pinching of hide and /or pelt substance between outer rings during hide and/or pelt transport.

Constant water, or other gaseous and/or liquid fluid flow throughout the entire working width of the ring roller assembly (during the pelt and/or hide splitting process) eliminates the section roller disassembly operation for manual cleaning.

An inner section ring made from bronze or other suitable material, machined to a predetermined size and tolerance, with radial holes in the wall of the inner section ring to allow passage of gaseous and/or liquid fluid.

An outer section ring, made from thermo-chemically hardened magnetic stainless steel, or other suitable treated metallic material or other suitable material, machined to a predetermined size and tolerance.

The inner and outer ring are designed to be assembled together to control the size of the constant, predetermined calibrated gap between the outer section rings; the inner and outer ring also are designed and assembled together to allow simultaneous driving and/or turning of the outer ring by the inner ring.

The hollow spline shaft, made from bronze or other suitable material, drives the inner rings.

The unique fluid inlet unit (FIG. 10) comprising a pivot arm (Item 1, FIG. 10), adjustment sleeve assembly (Item 9, FIG. 10) and the unique fluid flow fitting (Items 6,7,8, FIG. 10), all of which allow gaseous and/or liquid flow into the ring roller assembly.

A modified ring roller drive unit and clamp (FIG. 11) which allows proper installation of the ring roller and positive drive of the ring roller assembly.

The hollow spline shaft with regularly spaced radial holes in the shaft wall, the inner and outer section rings designed to allow a constant, predetermined calibrated gap between each section ring.

A ring roller assembly that allows water, or other gaseous and/or liquid fluid flow, from within the ring roller assembly to the outside surface of each section ring, thereby preventing entry and accumulation of lime solution, grease, flesh and/or fat within the ring roller assembly.

The ring roller according to the invention has the following further refinements compared to known ring rollers:

The outer ring profile is milled in a first and second milling operation, preferably CNC milling operations. The second milling operation is a finishing operation added to achieve a smooth surface to prevent the rings from making any marks on the spacers, and especially the teeth, during use of the ring roller. Known rings have a surface milled by a roughing cutter only, producing a "threaded" surface, which may excessively wear out the teeth of the bronze spacers. Individual rings can then come into contact with the bronze drive shaft, producing indents and burrs on the shaft. These damages to the shaft will make removal of spacers very difficult, if not impossible.

The length of the spacer is machined and subsequently coined, to higher tolerances. Known spacers were produced with a length variation of +0.025/−0.000 mm, whilst spacers according to the invention are allowed length tolerances of +0.0127/−0.000 mm. This substantially eliminates any discrepancies and problems associated with overall ring roller length.

The spacer teeth according to the invention are machined with a radius R (see FIG. 16A), to facilitate smooth and proper rotation of each corresponding outer ring.

The known ring rollers often have a lock nut with press-fit trip pins. The rotary male end component of the length adjusting nozzle housing also have two press-fit trip pins. When engaged with the lock nut, the rotary male end turn given rotary force by the trip pins. However, the pins are prone to breakage, under certain working conditions, thereby preventing rotation of the rotary male end causing premature wear of the rotary male end. Thus, proper axial pressure is not maintained and excessive water leakage occurr between the length adjusting nozzle and the female end nozzle. The invention utilizes a retainer nut without pins, having an octagonal shaped rotary male end of the length adjusting nozzle, which grips a complimentary profile of the female end nozzle. The octagonal shape can be substituted by any suitable shape such as square, hexagonal etc. Constant rotation is thus ensured when the male and female ends are engaged. The known lock nut construction has a further perceived disadvantage, the lock nut may come loose during reversal of the ring roller rotation. The reversal would occur, for instance, when an operator wanted to remove debris from the ring jaw insert edge. Reversing the ring roller rotation would force loose flesh and grease particles from the ring jaw insert edge and ring roller contact point. After the lock nut comes lose, the operator would often attempt to re-install the lock nut and torque it excessively, to prevent it from coming loose again. The torque would sometimes strip or otherwise damage the threads holding the lock nut to the drive shaft. The lock nut according to the invention, having a separate female spline nozzle on the drive shaft, prevents loosening of the lock nut given the positive engagement of the female spline nozzle.

It should be clearly understood that it is not intended that the invention be limited to the specific preferred embodiments described above. Thus, there will be many variations which will be apparent to those who are knowledgeable in the field, and such variations are considered to be within the scope of the invention as defined by the following claims. For example, a mixture of gaseous and liquid fluids may be used to flush the ring roller from inside, provided that the assembly can handle the required fluid flows.

What is claimed as the invention is:

1. A hide splitting machine comprising:
   an in-feed table;
   a ring roller;
   a gauge roller, and
   a traveling band knife arranged to split hides fed into a gap created between said ring roller and said gauge roller, wherein said ring roller is connectable to a pressurized fluid device for providing pressurized fluid to flow from inside said ring roller to a space outside said ring roller, to prevent ingress of substances into said ring roller from said space outside said ring roller.

2. The hide splitting machine as recited in claim 1, wherein said ring roller comprises
   a drive shaft, having a plurality of axial drive bars protruding in a radial direction from said drive shaft;
   a plurality of spacers, and
   a plurality of rings, the individual rings being loosely arranged on said drive shaft and arranged to cooperate with said spacers, so that said spacers transmit rotating forces from said drive shaft axial drive bars to said plurality of rings and a length of each of said plurality of spacers define a pre-set gap between each adjacent said plurality of rings, said drive shaft having a hollow center, and a plurality of first radial holes connecting an outer surface of said drive shaft with said hollow center, said hollow center of said drive shaft further being connected to a pressurized fluid system at one end of said drive shaft and sealed at the opposite end, to prevent ingress of substances into said ring roller from the outside by causing fluid to flow from said hollow center and outwards to said plurality of rings.

3. The hide splitting machine as recited in claim 2, wherein said first radial holes are arranged on said drive shaft between said protruding drive bars.

4. The hide splitting machine as recited in claim 3, wherein said individual rings have a substantially cylindrical outer surface, a smaller inside diameter, an open end and an opposite end having an end wall with a central through hole for said drive shaft to pass through, said central hole further having drive notches arranged to cooperate with said spacers.

5. The hide splitting machine as recited in claim 4, wherein said spacers have a large diameter, which is smaller than said inside diameter of a said individual ring, a first end with extending gap defining teeth, a second end for engagement with said first end of an adjacent spacer, and a middle portion between said first and second ends, said middle portion having a diameter which is smaller than said large diameter of the spacer.

6. The hide splitting machine as recited in claim 5, wherein said individual rings have seals arranged between adjacent rings, thereby improving the seal between adjacent rings so that only a controlled amount of fluid flows between adjacent rings.

7. The hide splitting machine as recited in claim 6, wherein said ring roller rests on an elastic roller.

8. The hide splitting machine as recited in claim 7, wherein said band knife is held adjacent said ring roller and said gauge roller by an upper and a lower knife jaw.

9. The hide splitting machine as recited in claim 8, wherein said machine further comprises a ring jaw plate and insert arranged to scrape flesh and grease off said ring roller.

10. The hide splitting machine as recited in claim 9, wherein said individual rings have pelt gripping grooves formed on said outer surface.

11. The hide splitting machine as recited in claim 5, wherein said middle portion further has a plurality of second radial holes to allow the pressurized fluid to flow from said first radial holes of said drive shaft and out to said individual rings via said second radial holes.

\* \* \* \* \*